US011790758B2

(12) United States Patent
Sjölund et al.

(10) Patent No.: US 11,790,758 B2
(45) Date of Patent: Oct. 17, 2023

(54) EMERGENCY RESPONSE SYSTEM USING VIRTUAL WORKING AREA

(71) Applicant: Swedome AB, Sollentuna (SE)

(72) Inventors: Peder Sjölund, Obbola (SE); Kim Cavallin, Järfälla (SE); Anders Ahlén, Knivsta (SE); Tobias Nilsson, Solna (SE); Rikard Renman, Stockholm (SE)

(73) Assignee: SWEDOME AB, Sollentuna (SE)

( * ) Notice: Subject to any disclaimer, the term of this patent is extended or adjusted under 35 U.S.C. 154(b) by 0 days.

(21) Appl. No.: 17/577,991

(22) Filed: Jan. 18, 2022

(65) Prior Publication Data

US 2022/0148412 A1 May 12, 2022

Related U.S. Application Data

(62) Division of application No. 15/930,040, filed on May 12, 2020, now Pat. No. 11,263,891.

(Continued)

(51) Int. Cl.
*G08B 25/00* (2006.01)
*H04W 4/90* (2018.01)
(Continued)

(52) U.S. Cl.
CPC ......... *G08B 25/006* (2013.01); *G08B 25/001* (2013.01); *G08B 25/10* (2013.01); *H04W 4/02* (2013.01); *H04W 4/90* (2018.02)

(58) Field of Classification Search
CPC .... G08B 25/006; G08B 25/001; G08B 25/10; G08B 13/19691; G08B 25/14;
(Continued)

(56) References Cited

U.S. PATENT DOCUMENTS 5,578,989 A * 11/1996 Pedtke .................. G08B 29/12
340/539.11
6,781,509 B1 * 8/2004 Oppedahl .............. G08B 25/10
340/517

(Continued)

OTHER PUBLICATIONS

Sutton et al.; Reinforcement Learning: An Introduction; Second Edition, in progress; Nov. 2018; The MIT Press Cambridge, Massachusetts, London, England.

(Continued)

*Primary Examiner* — Curtis J King
(74) *Attorney, Agent, or Firm* — NIXON & VANDERHYE

(57) ABSTRACT

Disclosed is a back-end system for emergency response, and a corresponding front-end system. The back-end system handles network communication to and/or from multiple information sources for gathering emergency response information from the information sources, including at least video data related to an emergency and/or security situation and additional emergency response information. The back-end system extracts subsets of information from the emergency response information at least partly based on input originating from one or more users and/or operators. The back-end system is configured to perform processing of the emergency response information to enable formation of a common overview of the emergency and/or security situation valid for different users/operators, while also enabling the emergency response information and/or extracted subsets thereof to be processed, compiled and/or filtered, and/or presented to a specific user and/or operator in a way that is customized for the specific user and/or operator of the emergency response system.

27 Claims, 16 Drawing Sheets

Related U.S. Application Data

(60) Provisional application No. 62/848,026, filed on May 15, 2019.

(51) Int. Cl.
*H04W 4/02* (2018.01)
*G08B 25/10* (2006.01)

(58) Field of Classification Search
CPC ........ G08B 25/009; H04W 4/90; H04W 4/02; H04W 4/38; H04L 67/38
See application file for complete search history.

(56) References Cited

U.S. PATENT DOCUMENTS

| | | | |
|---|---|---|---|
| 7,113,090 B1* | 9/2006 | Saylor | G08B 25/005 340/539.18 |
| 7,250,859 B2* | 7/2007 | Martin | G08B 25/10 340/539.19 |
| 7,526,269 B1 | 4/2009 | Walker, III | |
| 7,679,503 B2* | 3/2010 | Mason | H04L 67/34 340/541 |
| 8,269,623 B2* | 9/2012 | Addy | G08B 25/008 340/539.1 |
| 8,363,102 B1 | 1/2013 | Kadoch et al. | |
| 8,378,808 B1 | 2/2013 | Gwaltney | |
| 8,624,727 B2 | 1/2014 | Saigh et al. | |
| 8,872,915 B1 | 10/2014 | Scalisi et al. | |
| 9,013,294 B1* | 4/2015 | Trundle | G08B 29/188 340/522 |
| 9,171,450 B2 | 10/2015 | Cho et al. | |
| 9,609,003 B1* | 3/2017 | Chmielewski | H04L 67/025 |
| 10,003,944 B2 | 6/2018 | Choi et al. | |
| 10,051,600 B1 | 8/2018 | Zhong et al. | |
| 10,079,839 B1* | 9/2018 | Bryan | G05B 15/02 |
| 10,129,704 B1 | 11/2018 | Huseth et al. | |
| 10,341,609 B1* | 7/2019 | Lim | H04L 65/4061 |
| 10,559,193 B2 | 2/2020 | Naidoo et al. | |
| 10,665,070 B1 | 5/2020 | Picardi | |
| 10,713,928 B1* | 7/2020 | Gerstberger | G08B 13/19645 |
| 10,733,857 B1 | 8/2020 | Siminoff et al. | |
| 10,762,769 B1 | 9/2020 | Sommerlatt | |
| 10,810,845 B2 | 10/2020 | Coles | |
| 10,854,058 B2 | 12/2020 | Davies et al. | |
| 10,868,712 B1 | 12/2020 | Hutz | |
| 10,909,830 B1 | 2/2021 | Stapleford et al. | |
| 11,195,408 B1 | 12/2021 | Sommerlatt | |
| 11,206,327 B2 | 12/2021 | Reber et al. | |
| 2004/0004542 A1 | 1/2004 | Faulkner et al. | |
| 2004/0004543 A1 | 1/2004 | Faulkner et al. | |
| 2005/0174229 A1* | 8/2005 | Feldkamp | G08B 25/08 340/541 |
| 2007/0262857 A1* | 11/2007 | Jackson | G08B 13/19663 340/506 |
| 2009/0125584 A1 | 5/2009 | Agrawala et al. | |
| 2009/0170529 A1 | 7/2009 | Kane | |
| 2010/0127850 A1* | 5/2010 | Poder | G08B 13/2491 340/517 |
| 2010/0153853 A1 | 6/2010 | Dawes et al. | |
| 2010/0248681 A1 | 9/2010 | Phills | |
| 2011/0140882 A1 | 6/2011 | Jang | |
| 2011/0254680 A1* | 10/2011 | Perkinson | G08B 29/14 340/5.1 |
| 2011/0254681 A1* | 10/2011 | Perkinson | G08B 29/14 340/5.1 |
| 2012/0154138 A1* | 6/2012 | Cohn | G08B 25/14 340/501 |
| 2012/0169487 A1 | 7/2012 | Poder | |
| 2012/0259984 A1* | 10/2012 | Marshall | H04L 67/00 709/227 |
| 2013/0183924 A1 | 7/2013 | Saigh et al. | |
| 2013/0281044 A1 | 10/2013 | Smith et al. | |
| 2014/0033327 A1 | 1/2014 | Conte | |
| 2014/0056224 A1* | 2/2014 | Rubin | H04J 11/005 370/328 |
| 2014/0167954 A1* | 6/2014 | Johnson | H04W 76/10 340/539.11 |
| 2014/0226010 A1 | 8/2014 | Molin et al. | |
| 2014/0289818 A1 | 9/2014 | Yahata et al. | |
| 2014/0293046 A1 | 10/2014 | Ni | |
| 2014/0313034 A1 | 10/2014 | Dodson | |
| 2014/0359101 A1 | 12/2014 | Dawes et al. | |
| 2014/0368601 A1 | 12/2014 | Decharms | |
| 2015/0029295 A1 | 1/2015 | Gupta et al. | |
| 2015/0312742 A1 | 10/2015 | Choi et al. | |
| 2015/0347740 A1 | 12/2015 | O'Malley et al. | |
| 2015/0356017 A1 | 12/2015 | Planat et al. | |
| 2015/0365246 A1* | 12/2015 | Kane | H04W 4/08 709/203 |
| 2016/0125725 A1 | 5/2016 | Sager et al. | |
| 2016/0191862 A1 | 6/2016 | Yokomitsu et al. | |
| 2016/0274759 A1 | 9/2016 | Dawes | |
| 2016/0337830 A1 | 11/2016 | Moss | |
| 2016/0373910 A1* | 12/2016 | Moss | G06F 9/453 |
| 2017/0279799 A1 | 9/2017 | Baltzer et al. | |
| 2018/0047212 A1 | 2/2018 | Long | |
| 2018/0060094 A1 | 3/2018 | Tsuji | |
| 2018/0075720 A1 | 3/2018 | Davies et al. | |
| 2018/0123629 A1* | 5/2018 | Wetzig | G08B 21/0423 |
| 2018/0232973 A1* | 8/2018 | Teh | G07C 9/27 |
| 2018/0262897 A1 | 9/2018 | Hennessy et al. | |
| 2018/0324300 A1 | 11/2018 | Banaudha et al. | |
| 2018/0350225 A1 | 12/2018 | Siminoff et al. | |
| 2019/0089729 A1 | 3/2019 | Nishi | |
| 2019/0147734 A1* | 5/2019 | Kumar Murugesan | G06F 3/14 348/159 |
| 2019/0206233 A1 | 7/2019 | Huseth et al. | |
| 2019/0215694 A1* | 7/2019 | Rubin | H04L 63/1458 |
| 2020/0143654 A1 | 5/2020 | Howard et al. | |
| 2020/0221278 A1 | 7/2020 | Balasubramanian et al. | |
| 2020/0274962 A1 | 8/2020 | Martin et al. | |
| 2020/0329500 A1 | 10/2020 | Newman et al. | |
| 2021/0110682 A1 | 4/2021 | Howard et al. | |
| 2021/0217292 A1 | 7/2021 | Dobkins | |
| 2021/0343126 A1* | 11/2021 | Drako | G08B 13/19686 |
| 2022/0076556 A1* | 3/2022 | Lindenau | H04M 11/04 |
| 2022/0240072 A1 | 7/2022 | Sabino | |
| 2022/0319508 A1* | 10/2022 | Furman | G06F 40/30 |
| 2023/0060136 A1 | 3/2023 | Correnti et al. | |

OTHER PUBLICATIONS

U.S. Office Action issued in U.S. Appl. No. 17/577,985 dated Jan. 18, 2023.
U.S. Appl. No. 17/577,974, filed Jan. 18, 2022.
U.S. Appl. No. 17/577,985, filed Jan. 18, 2022.
Office Action issued in U.S. Appl. No. 17/577,974 dated Mar. 9, 2023.

* cited by examiner

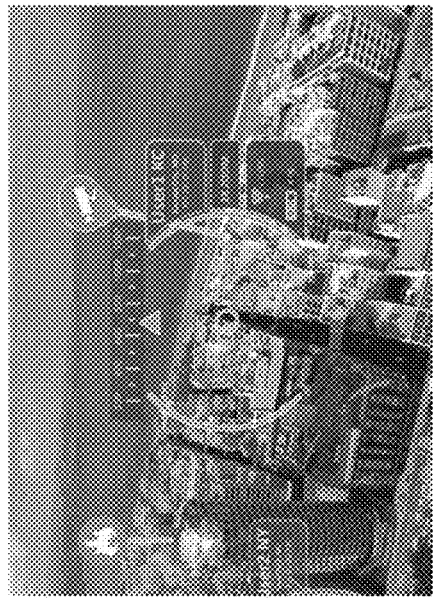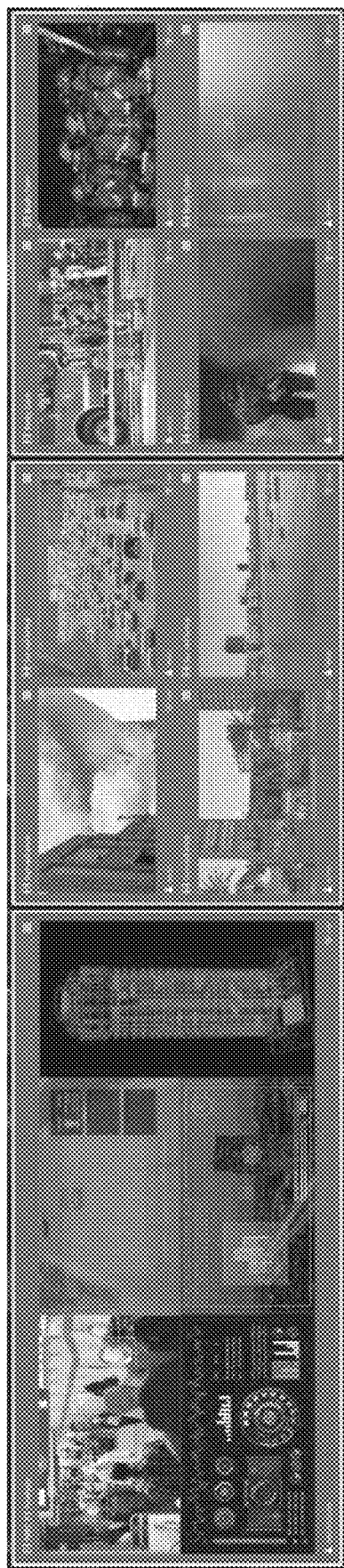
FIG. 4E

EMERGENCY RESPONSE SYSTEM USING VIRTUAL WORKING AREA

CROSS-REFERENCE TO RELATED APPLICATION

This application is a divisional of U.S. patent application Ser. No. 15/930,040 filed on May 12, 2020, which claims benefit of U.S. Provisional Application No. 62/848,026 filed on May 15, 2019, the contents of which are hereby incorporated by reference.

TECHNOLOGICAL FIELD

The present disclosure generally relates to emergency response, security response and/or public safety, and an emergency response system and corresponding sub-systems such as a back-end system and a front-end system for such an emergency response system, and more particularly relates to an emergency response system and/or sub-systems for enabling appropriate and well-informed decisions and/or actions related to safety of people and/or their surroundings, and corresponding methods as well as computer-programs and computer program products.

BACKGROUND

Emergency response systems for safety and security may deal with police, fire, ambulance, civil defense, corporate security, industrial security, military response and/or public safety for handling and responding to emergency and/or security situations. Such systems are of outmost importance, and both authorities and emergency response service providers and/or system providers continuously aim to develop better systems, tools and services for faster, more reliable and better emergency response to ensure public safety.

Although significant advances have been made in this area of research and development, there is still a general need for improved emergency response and/or public safety systems. By way of example, there is a need for a system that allows the system operator to respond to emergencies quickly, accurately and/or in real time to mobilize equipment, human resources and essential supplies to the emergency location.

There is also a demand for improvements related to coverage and/or display of live events in general, including emergency and/or security situations.

SUMMARY

It is a general object to provide improved systems, sub-systems, tools, services and/or methods for emergency response and/or public safety.

It is a specific object to provide a back-end system for emergency response, security response and/or public safety, also referred to as the back-end part of an emergency response system.

Another specific object is to provide a front-end system for emergency response, security response and/or public safety, also referred to as the front-end part of an emergency response system.

Yet another specific object is to provide an overall emergency response system comprising such a back-end system and/or front-end system.

Still another specific object is to provide a computer-implemented demonstration system of an emergency response system.

It is also a specific object to provide a computer-implemented analysis system of an emergency response system.

Yet another specific object is to provide corresponding computer program products.

These and other objects are met by embodiments as defined herein.

According to a first aspect, there is provided a back-end system for emergency response, security response and/or public safety, also referred to as the back-end part of an emergency response system. The back-end system is configured to handle network communication to and/or from multiple information sources for gathering emergency response information from said information sources, including at least audio and/or video data related to an emergency and/or security situation and additional emergency response information. The back-end system is configured to extract subsets of information from said emergency response information at least partly based on input originating from one or more users and/or operators. The back-end system is configured to perform processing of said emergency response information to enable formation of a common overview of the emergency and/or security situation valid for different users/operators, while also enabling said emergency response information and/or extracted subsets thereof to be processed, compiled and/or filtered, and/or presented to a specific user and/or operator in a way that is customized for said specific user and/or operator of the emergency response system.

According to a second aspect, there is provided a front-end system for emergency response, security response and/or public safety, also referred to as the front-end part of an emergency response system. The front-end system is configured to receive emergency response information from a back-end system of said emergency response system including at least audio and/or video data related to an emergency and/or security situation and additional emergency response information. The front-end system is configured to provide a common overview of the emergency and/or security situation based on said emergency response information and/or extracted subsets thereof for presentation and/or visualization to one or more users and/or operators, wherein said common overview is valid for different users/operators, while also enabling presentation and/or visualization of said emergency response information and/or extracted subsets thereof to a specific user and/or operator in a way that is customized for said specific user and/or operator of the emergency response system.

According to a third aspect, there is provided an overall emergency response system comprising such a back-end system and/or front-end system.

According to a fourth aspect, there is provided a computer-implemented demonstration system of an emergency response system comprising such a back-end system and/or front-end system, operating based on emergency response information relating to a fictive emergency and/or security situation or an emergency and/or security situation that has already occurred.

According to a fifth aspect, there is provided a computer-implemented analysis system of an emergency response system comprising such a back-end system and/or front-end system, operating based on emergency response information relating to an emergency and/or security situation that has already occurred.

According to a sixth aspect, there is provided a computer-program product comprising a non-transitory computer-readable medium having stored thereon a computer program comprising instructions, which when executed by at least one processor, cause the processor or processors to: i) handle network communication to and/or from multiple information sources for gathering emergency response information from said information sources, including at least audio and/or video data related to an emergency and/or security situation and additional emergency response information; ii) extract subsets of information from said emergency response information at least partly based on input originating from one or more users and/or operators; and iii) perform processing of said emergency response information to enable formation of a common overview of the emergency and/or security situation valid for different users/operators, while also enabling said emergency response information and/or extracted subsets thereof to be processed, compiled and/or filtered, and/or presented to a specific user and/or operator in a way that is customized for said specific user and/or operator of the emergency response system.

According to a seventh aspect, there is provided a computer-program product comprising a non-transitory computer-readable medium having stored thereon a computer program comprising instructions, which when executed by at least one processor, cause the processor or processors to: i) receive emergency response information from a back-end system of said emergency response system including at least audio and/or video data related to an emergency and/or security situation and additional emergency response information; and ii) provide a common overview of the emergency and/or security situation based on said emergency response information and/or extracted subsets thereof for presentation and/or visualization to one or more users and/or operators, wherein said common overview is valid for different users/operators, while also enabling presentation and/or visualization of said emergency response information and/or extracted subsets thereof to a specific user and/or operator in a way that is customized for said specific user and/or operator of the emergency response system.

An emergency response system and method may be disclosed herein, which uses cutting-edge technology including modern telecommunication and/or radio communication infrastructure, distributed cloud and/or edge computing, efficient information processing and/or visualization techniques to enable information from a plurality of information sources to be processed, compiled and/or filtered, and/or presented to an emergency response system user or operator, e.g. in a way that is customized in dependence on the emergency or security situation and/or profile, role or priority of the user of the emergency response system.

In a sense, at least some aspects of the proposed technology can be regarded as a unique system integration for emergency/security response and/or public safety including technology for quickly and effectively gathering useful information from multiple information sources, technology for effectively processing large amounts of gathered information and for extracting suitable subsets of information and/or technology for visualizing and/or otherwise presenting the extracted information to the user/operator.

The proposed system integration may be at least partly used as a decision support system and/or command control center for enabling appropriate and/or well-informed emergency response decisions and/or actions.

The proposed technology also provides a computer-implemented demonstration system of such an emergency response system, e.g. using input data relating to a fictive emergency and/or security situation or an emergency and/or security situation that has already occurred.

The proposed technology also provides a computer-implemented analysis system for such an emergency response system, e.g. using input data relating to an emergency and/or security situation that has already occurred.

The proposed technology further generally concerns methods, systems and sub-systems for coverage and/or display of live events in general, including emergency and/or security situations. For example, audio and/or video data from cameras covering such events may be relayed to a server system, which can communicate with a client application for rendering requested viewports to an end-user, in the manner described herein.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

The invention, together with further objects and advantages thereof, may best be understood by making reference to the following description taken together with the accompanying drawings, which are not necessarily drawn to scale, and wherein:

FIGS. 4A to 4E are schematic diagram illustrating examples of a system frontend and backend, as well as exemplary front-end visualizations of an emergency response system, in accordance with an example embodiment;

DETAILED DESCRIPTION

Figure 1:
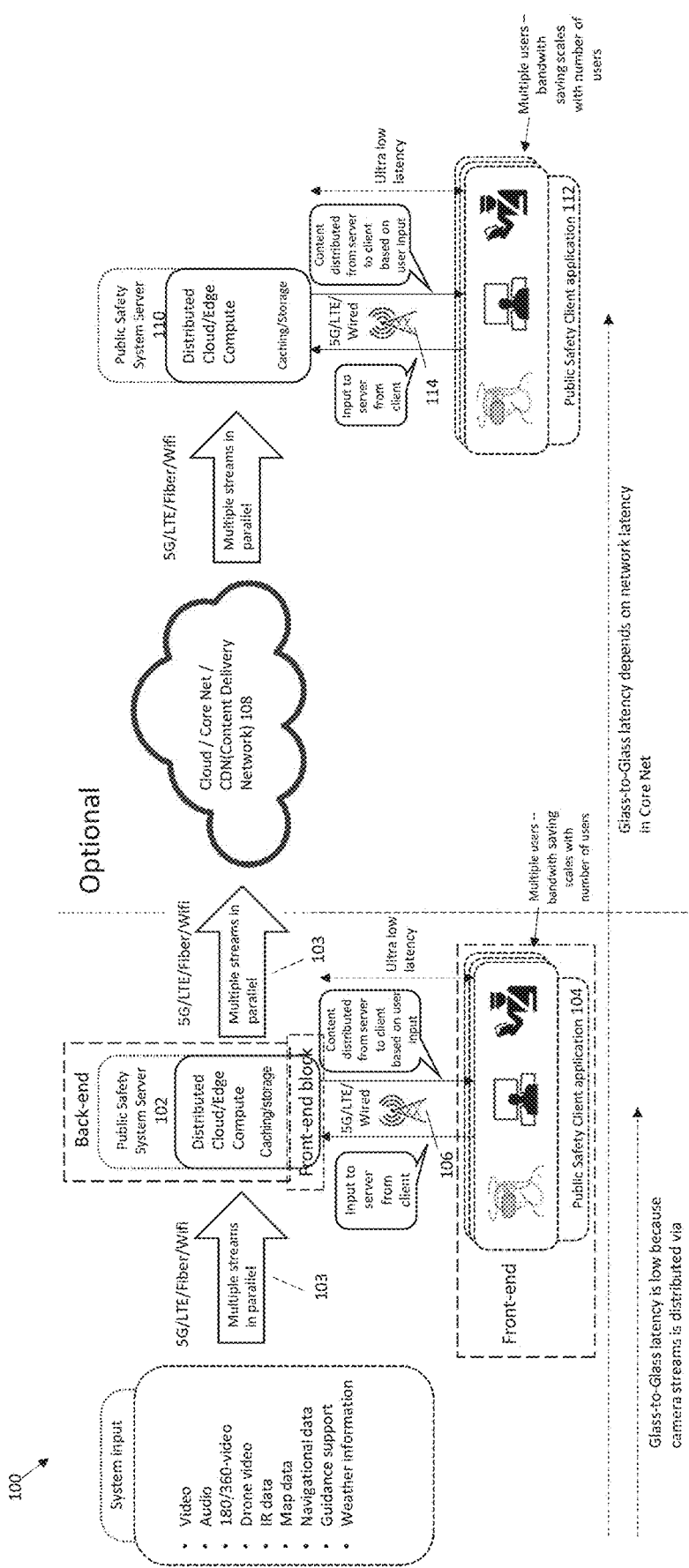
FIG. 1 is a schematic diagram illustrating an example of a network environment and architecture of an emergency response system for enabling appropriate and well-informed decisions and/or actions during an emergency, in accordance with an example embodiment.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

In the following, the proposed technology will be described with reference to non-limiting illustrative examples.

According to a first aspects, there is provided a back-end system for emergency response, security response and/or public safety, also referred to as the back-end part of an emergency response system. The back-end system is configured to handle network communication to and/or from multiple information sources for gathering emergency response information from said information sources, including at least audio and/or video data related to an emergency and/or security situation and additional emergency response information. The back-end system is configured to extract subsets of information from said emergency response information at least partly based on input originating from one or more users and/or operators. The back-end system is further configured to perform processing of said emergency response information to enable formation of a common overview of the emergency and/or security situation valid for different users/operators, while also enabling said emergency response information and/or extracted subsets thereof to be processed, compiled and/or filtered, and/or presented to a specific user and/or operator in a way that is customized for said specific user and/or operator of the emergency response system.

By way of example, the back-end system may be configured to perform processing of said emergency response information to enable said emergency response information and/or extracted subsets thereof to be processed, compiled and/or filtered, and/or presented to said specific user and/or operator in a way that is customized in dependence on the emergency or security situation and/or profile, role or priority of the user.

For example, the back-end system may be configured to perform processing of said emergency response information to enable formation of said common overview of the emergency and/or security situation as a virtual working area where users and/or operators are able to cooperate and interact in real time or near real time to handle a common emergency situation or a common security situation.

In a particular example, the back-end system is implemented as a software-based application for execution on a server.

As an example, the server may be an edge server or a cloud server.

Optionally, the back-end system may be configured to extract a plurality of subsets of decision-making parameters based on real-time emergency data (and/or non-real time data such as infrastructure information, map data, statistical and/or historical data, and so forth) and to select a relevant subset from the plurality of subsets of decision-making parameters based on a request from a front-end interface and generate corresponding emergency response, and to transmit the generated emergency response to the front-end interface.

In a particular example, the back-end system may be configured to allow at least audio and/or video data to be collected, transferred and/or combined with other data for presentation to one or more users or operators, normally superimposed together with information to support enhanced perception and understanding of the situation and the surroundings.

It is possible for the back-end system to be configured to enable connection to several operators and/or supporting personnel, on-site and/or off-site for enabling cooperative teamwork between various individual users/operators that can see and hear the same or similar information.

As an example, the back-end system may be configured for gathering emergency response information from cameras and/or other sensors and/or continuously updated databases.

For example, the back-end system may be configured for gathering emergency response information including video streams, audio streams, street view cameras, inside-building cameras, drones, helicopters, and/or specialized 360 degree cameras, various other sensor systems such as heat sensors and/or infrared sensors, map data, navigational information and/or guidance support data, traffic information, information on buildings and infrastructure, and/or weather information, medical data and/or indications concerning on-site staff such as firemen or police officers.

In a particular example, the back-end system may be configured to respond to a viewport request (e.g. related to an omnidirectional camera or a virtual 3D image/video representation) from a client application managed by a user/operator of the emergency response system and to relay at least audio and/or video data corresponding to the viewport request, towards the client application.

Omnidirectional cameras are sometimes also referred to as 180/360-degree cameras or spherical cameras.

For example, the viewport may be related to an omnidirectional camera or a virtual 3D image/video representation, e.g. a 3D virtual space rendered by a software application within which the user may navigate. In the latter case, the 3D virtual space may be built up or populated based on image/video data from different cameras, such as omnidirectional cameras and/or other suitable cameras, and/or computer-generated graphics, and/or one or more sound sources. Each sound source may be related to a specific point or region in the 3D virtual space. Spatial sound technology may be applied to enhance the user's sound experience.

For example, the back-end system may be configured to transfer at least audio and/or video data related to a limited Field of View (FoV) plus a marginal in response to the viewport request to be able to cater for and adapt to sudden changes of viewport direction of the user.

Optionally, the viewport request may include information representative of the head direction of a user, and said back-end system is configured to adapt viewport based on the head direction and to transfer the corresponding viewport-based video and/or additional data towards the client application for rendering.

By way of example, the back-end system may be implemented as a server application, and a viewport in the server application may be adapted to match the user's head direction, and said back-end system is configured to stream at least audio and/or video data corresponding to the viewport back towards the client application for rendering.

As an example, the head direction may be related to the head set of a user and logically coupled to a virtual head positioned inside a virtual 3D space that is maintained by the server application. When the user turns the head, the virtual head position is also changed and the corresponding field of view (e.g. including audio and/or video) in the virtual 3D space may then be streamed back to the user client application for rendering.

It should be understood that the server application may receive additional information from the client application, e.g. in the form of interaction data such as keyboard input and/or speech input.

In a particular example, the back-end system comprises one or more processors and memory, the memory comprising instructions executable by said one or more processors, whereby the back-end system is operative as a back-end system for emergency response, security response and/or public safety.

According to a second aspect, there is provided a front-end system for emergency response, security response and/or public safety, also referred to as the front-end part of an emergency response system. The front-end system is configured to receive emergency response information from a back-end system of said emergency response system including at least audio and/or video data related to an emergency and/or security situation and additional emergency response information. The front-end system is further configured to provide a common overview of the emergency and/or security situation based on said emergency response information and/or extracted subsets thereof for presentation and/or visualization to one or more users and/or operators, wherein said common overview is valid for different users/operators, while also enabling presentation and/or visualization of said emergency response information and/or extracted subsets thereof to a specific user and/or operator in a way that is customized for said specific user and/or operator of the emergency response system.

By way of example, the front-end system may be configured to enable presentation and/or visualization of said emergency response information and/or extracted subsets thereof to a specific user and/or operator in a way that is customized in dependence on the emergency or security situation and/or profile, role or priority of the user.

For example, the front-end system may be configured to provide said common overview as a common working area formed as a virtual environment where users and/or operators are able to cooperate and interact in the same virtual environment and/or working area in real time or near real time to handle a common emergency situation or a common security situation.

Naturally, the front-end system may be implemented as a normal front-end client application running on a processor and/or computer. In other words, at least part of said front-end system may be implemented as a client application serving as an interface towards and/or from one or more users/operators.

In a particular example, at least part of the front-end system is implemented as a front-end block on a server for cooperation with a client application of a user. In this case, the user's client application may be much thinner or lighter in terms of computational resources and/or communication bandwidth, a so-called thin client. The more computationally demanding or heavy part(s) of the overall front-end system may thus be executed by a server to which a thin client application can be connected.

By way of example, a front-end part on the server may collect data from a back-end part on the same server and/or from another (back-end) server, and/or from one or more databases. The front-end part on the server may then process and/or prepare the data into presentable form customized for one or more users and selectively forward the presentable data to the client application of the user(s) in a bandwidth optimized manner.

By way of example, the front-end system may be configured to enable presentation of selected information including audio and video streams, maps, weather and infrastructure presentations, and/or traffic information to the user/operator.

Optionally, the front-end system may be adapted for use with immersive visualization technology for rendering and/or visualizing at least part of said emergency response information and/or extracted subsets thereof.

For example, the front-end system is configured for use with immersive visualization technology that provides an immersive overview of the situation, including a superposition of different emergency response information.

In a particular example, the front-end system may be configured to send a viewport request (e.g. related to an omnidirectional camera and/or a virtual 3D image/video representation) to the back-end system of the emergency response system and to receive at least audio and/or video data, corresponding to the viewport request, from the back-end system. It should be understood that the viewport request and the corresponding video data may be communicated, e.g. directly between a normal front-end client application and the back-end system or between a thin front-end client and the back-end system via a server-based front-end block.

For example, the viewport may be related to an omnidirectional camera as such or a virtual 3D image/video representation, e.g. a 3D virtual space rendered by a software application within which the user may navigate.

As an example, the viewport request may include information representative of the head direction of a user, and the front-end system may be configured to send the information representative of the head direction of a user to the back-end system, and receive at least audio and/or video data corresponding to a viewport adapted based on the head direction.

Optionally, the front-end system may be configured for interaction with an information presentation sub-system, which employs head worn see-through imagery displays/glasses and/or immersive Virtual Reality/Mixed Reality/Augmented Reality (VR/MR/AR) technologies and utilizes head-tracking for providing a transparent canopy effect for a user/operator.

As an example, the front-end system may be configured to request information from one or more of the edge servers and/or cloud servers acting as different, isolated or interacting, back-end systems.

For example, the front-end system may be configured to receive the video data via a closest edge server. In this way, low latency is ensured.

By way of example, the front-end system may be configured to operate as a decision support system and/or command control center for enabling emergency response decisions and/or actions.

It is possible for the front-end system to be configured such that it comprises one or more processors and memory, the memory comprising instructions executable by said one or more processors, whereby the front-end system is operative as a front-end system for emergency response, security response and/or public safety.

According to a third aspect, there is provided an overall emergency response system comprising a back-end system according to the first aspect described herein and a front-end system according to the second aspect described herein.

According to an illustrative aspect it is feasible to build and configure an enhanced emergency/security response and/or public safety system, using cutting-edge technology including modern tele- and radio communication infrastructure and distributed cloud and/or edge computing to enable a plurality of information sources to be processed, compiled and/or filtered, and presented to an emergency/security response system user/operator, e.g. in a way that is customized in dependence on the emergency/security situation and/or profile, role or priority of the user of the system.

By way of example, an overall digital platform according to the proposed technology may be based on two basic and linked system parts; the data back-end and the user front-end. The data back-end plane may be configured to handle network communication to and/or from external information sources and systems, ensure synchronization of time-critical data and/or management and integration of third-party systems.

Large amounts of data may be effectively handled by the back-end part, and data transfer protocols may be used for integration with the user front-end. For example, the user front-end may be a client-implementation and serve as the interface towards and/or from the user(s). Preferably, such a client implementation is configured to be able to operate without requirements for heavy data processing considering enablement of using mobile and battery-powered units, and/or may use immersive visualization technology/tools, as will be exemplified later on.

For example, the novel emergency/security response system may be connectable or connected for access to a set of cloud servers and/or stationary and/or mobile edge servers for obtaining useful information for effective decision-support. The edge servers and/or cloud servers store information obtained from a set of originating information sources, such as cameras and/or other sensors and/or continuously updated databases.

In a client-server based system, where the emergency/security response system may at least partially be executed as a client application, the operator of the client system may request information from one or more of the edge servers and/or cloud servers and/or receive at least some information therefrom without the need for any on-the-fly requests.

The overall platform may handle layers of customer-specific applications that enables interaction, visualization and/or configuration of functions, which with low latency cooperate with a scalable server-based system part that performs the major part of the data processing.

The client and the back-end may cooperate through bidirectional communication of information; from the back-end to the client as well as from the client to the back-end.

By way of example, the distribution service for transferring data between the information sources and the back-end system and/or between the back-end system and the client part is/are preferably based on a Service Level Agreement (SLA) communication network or similar for providing secure and stable communication/transfer of data, e.g. with proper encryption and guaranteed level of quality and availability.

An important sub-system in this context is the information handling system, decision support system and/or command/control center, which may be configured to obtain information from several different sources such as one or more of the following:

Video and/or audio streams, e.g. from street view cameras, inside-building cameras, drones, helicopters, and/or specialized 360-degree cameras.

Various other sensor systems such as heat sensors and/or infrared (IR) sensors.

Map data/information.

Navigational information and/or guidance support data.

Traffic information.

Information on buildings and infrastructure.

Weather information.

Emergency/security response information.

Medical data and/or indications concerning on-site staff such as firemen or police officers.

By way of example, this information handling system, decision support system and/or command/control center may be configured to effectively extract suitable subsets of the overall information for presentation to a user/operator.

For example, the information can be extracted and possibly even requested and/or presented based on the role and/or profile of the user/operator.

The proposed technology provides a selectable number of technological means (as exemplified below) for presentation of the selected information to the user/operator, such as audio and video streams (preferably with zooming and/or direction selectivity), maps, weather and infrastructure presentations, and/or traffic information.

For example, the proposed technology may utilize Virtual Reality/Mixed Reality/Augmented Reality (VR/MR/AR) headsets for presentation. In a particular example, the information presentation sub-system employs advanced head worn see-through imagery displays/glasses and immersive VR/MR/AR technologies, and utilizes head-tracking for providing a transparent canopy effect for the user in a concise and timely form to facilitate fast, yet effective decision making.

The proposed technology may thus employ visualization technology that provides an immersive overview of the situation, possibly including a superposition of useful information such as geo-positioned information and graphics.

By way of example, the system may facilitate improved command and control for the operator/user to take informed decisions and/or actions. In particular, the system may e.g. aid in enhanced operational situation awareness as compared to existing systems and/or assist in reducing the time for action during emergency. The system may optionally provide accurate and time critical information directly in the eye of the operator. By way of example, this may be performed by human-centric design and may use immersive visualization technology.

For a better understanding, the proposed technology may now be described with reference to illustrative, non-limiting examples.

FIG. 1 is a schematic diagram illustrating an example of a network environment and architecture of an emergency response system for enabling appropriate and well-informed decisions and/or actions during an emergency, in accordance with an example embodiment. In this example, the general emergency response system is exemplified as a public safety system, but it is not limited thereto.

Among other things, there is shown a network environment that may include a public safety system server 102, a communication network 103, a public safety client application 104, communication network 106 (5G/LTE), a content delivery network 108, a public safety system server 110, a public safety client application 112, a communication network 114 (such as 5G/LTE). There is further shown one or more inputs from external information sources over the communication network 103 to the emergency response system (here exemplified as a public safety system), such as 360 degrees video and/or other input data. One or more operators may be associated with each of the public safety client application 104 and the optional public safety client application 112. The public safety system server 102 may be communicatively coupled to the public safety client application 104, via the communication network 106. Also, the public safety system server 102 may be communicatively coupled to the optional public safety system server 110 via the content delivery network 108.

All the components in the network environment may be coupled directly or indirectly to the network 108. The components described in the network environment may be further broken down into more than one component and/or combined together in any suitable arrangement. Further, one or more components may be rearranged, changed, added, and/or removed.

The public safety system server 102 may comprise suitable logic, circuitry, interfaces, and/or code that may be configured to obtain useful information for effective decision-support of the emergency response system. The public safety system server 102 may act as a data back-end of the security response system to handle network communication to and from external information sources and systems. Further, the public safety system server 102 may be configured to ensure synchronization of time-critical data and/or management and integration of third-party systems. In accordance with an embodiment, the public safety system server 102 may be configured to store information obtained from a set of originating information sources, such as cameras and/or other sensors and/or continuously updated databases. The operator of a client system, such as the public safety client application 104 may request information from the public safety system server 102 and/or receive at least some information therefrom without the need for any on-the-fly requests. In accordance with an exemplary embodiment, a viewport request related to the omnidirectional camera or a virtual representation thereof may be sent from the public safety client application 104 managed by the operator to the public safety system server 102 through which the video stream may be relayed. The public safety system server 102 may then distribute the video information corresponding to the viewport request.

By using viewport dependent visualization technology, where a user ca n receive video/image data related to a specific viewport, or limited Field of View (FoV), it is possible to significantly reduce the bandwidth requirements. For example, the use of viewport dependent technology may dramatically reduce the bandwidth that is required to achieve high resolution real time user experience with low latency in the Radio Access Network (RAN) such as that of a 5G networks, e.g. 3K or higher viewport resolution based on original 20K (or higher) camera resolution. Mobility and quality of service provided by the 5G networks may enable a wide range of use cases for high definition real time applications. Lower camera resolutions are feasible to transfer over 4G/LTE, but at somewhat higher latency. The proposed technology is not limited to use with 4G or 5G, but can also be used with future communication technologies.

For example, it may be useful to configure the system to transfer video/image data related to a limited FoV plus a marginal in response to a viewport request to be able to cater for and adapt to sudden changes of viewport direction of the user. For this reason, low latency is important in order for the server to be able to respond quickly to user input and/or requests. It may also be useful to apply user movement pattern analysis to be able to predict viewport changes by the user, e.g. by means of eye tracking technology.

As exemplarily illustrated, the public safety system server 102 may also include a database, which may store, but not limited to, navigation data, weather information, IR data, video data, and audio data. The data may also include map data that includes cartographic data, routing data, and maneuvering data of a roadway. In addition, the map data may include event data (e.g., traffic incidents, construction activities, scheduled events, unscheduled events, etc.).

The public safety system server 102 may be configured to provide a repository of techniques for implementation of emergency response services to users. For example, the public safety system server 102 may include, but not limited to, techniques related to geocoding, routing (multimodal, intermodal, and unimodal), image recognition algorithms, immersive visualization techniques, clustering algorithms, machine learning, natural language processing algorithms, and artificial intelligence algorithms.

The data for different modules of the public safety system server 102 may be collected using a plurality of technologies including, but not limited to drones, sensors, connected vehicles, cameras, probes, and chipsets.

The public safety system server 102 may have a database which may be a master map database stored in a format that facilitates updating, maintenance, and development. For example, the master map database or data in the master map database may be in an Oracle spatial format or other spatial format, such as, for development or production purposes. The Oracle spatial format or development/production database may be compiled into a delivery format, such as a geographic data files (GDF) format. The data in the production and/or delivery formats may be compiled or further compiled to facilitate emergency response services across different operators. It may be appreciated that the server illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

The public safety client application 104 may comprise suitable logic, circuitry, interfaces, and/or code that may be configured to provide assistance to the personnel at emergency sites. In accordance with an embodiment, the UE may be configured to provide navigation and map functions (such as, guidance and map display) for an end user, such as a firefighter to reach the emergency spot (not shown in the FIG. 1). The user interface of the public safety client application 104 may be configured to enable the end user (one or more operators) associated with the emergency response system to access a digital platform. The public safety client application 104 may be installed in different entities, such as a vehicle. The public safety client application 104 may include a user interface which is easy to use. In accordance with an embodiment, the public safety client application 104 may be installed in an in-vehicle navigation system, such as, an infotainment system, a personal navigation device (PND), a portable navigation device, a cellular telephone, a smart phone, a personal digital assistant (PDA), a watch, a camera, a laptop computer, a tablet computer, a workstation. Additionally, or alternatively, the public safety client application 104 may be installed in a fixed computing device, such as a personal computer, computer workstation, kiosk, office terminal computer or a system.

In accordance with an embodiment, the public safety system server 102 may provide a services-platform to the public safety client application 104. The services may include navigation functions, traffic related updates, weather related updates, warnings and alerts, and/or indoor mapping services. In accordance with an embodiment, the services may be provided by the plurality of content providers. In some examples, the plurality of content providers may access various Software Development Kits (SDKs) from the services platform of the public safety system server 102 for implementation of one or more services. In accordance with an embodiment, the services platform and the digital platform may be integrated into a single platform to provide a suite of applications for users of the emergency response system. The public safety client application 104 may be configured to interface with the services platform, the plurality of content providers, and the digital platform over the communication network 106 and the content delivery network 108. Thus, the public safety system server 102 may enable provision of cloud-based services for the public safety client application 104. In accordance with an embodiment, the plurality of content providers may be configured to maintain data stored in the public safety system server 102.

The communication network 106 may comprise suitable logic, circuitry, and interfaces that may be configured to provide a plurality of network ports and a plurality of communication channels for transmission and reception of data, such as the sensor data, map data, navigation data, IR data etc. Each network port may correspond to a virtual address (or a physical machine address) for transmission and reception of the communication data. For example, the virtual address may be an Internet Protocol Version 4 (IPv4) (or an IPv6 address) and the physical address may be a Media Access Control (MAC) address. The communication network 106 may include a medium through which the public safety system server 102 and the public safety client application 104 may communicate with each other. The communication network 106 may be associated with an application layer for implementation of communication protocols based on one or more communication requests from at least one of the one or more communication devices. The communication data may be transmitted or received, via the communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, 811.15.4, cellular communication protocols, and/or Bluetooth (BT) communication protocols. The same applies for other communication networks such as communication network 103, as well as the overall distribution network from any information source to the end-user.

Examples of the communication network 103 and/or 106 may include, but is not limited to a wireless channel, a wired channel, a combination of wireless and wired channel thereof. The wireless or wired channel may be associated with a network standard which may be defined by one of a Local Area Network (LAN), a Personal Area Network (PAN), a Wireless Local Area Network (WLAN), a Wireless Sensor Network (WSN), Wireless Area Network (WAN), Wireless Wide Area Network (WWAN), a Long Term Evolution (LTE) network, a 5G network or similar network, a plain old telephone service (POTS), and a Metropolitan Area Network (MAN). Additionally, the wired channel may be selected on the basis of bandwidth criteria. For example, an optical fiber channel may be used for a high bandwidth communication. Further, a coaxial cable-based or Ethernet-based communication channel may be used for moderate bandwidth communication.

In operation, the public safety system server 102 may be configured to obtain, real-time emergency data from at least one input device. The real-time emergency data may comprise one or more of video, audio, IR data, map data, navigational data, guidance support, or weather information. In accordance with an embodiment, the real-time data collected from an image capture device may be referred as sensor data. Latency is the time it takes for something to propagate in a system. Specifically, glass to glass latency is the time it takes for something to go from the glass of the image capture device to the glass of a display associated with the public safety client application 104. In accordance with an embodiment, glass to glass latency may be low because image capture device streams are distributed via closest edge node in FIG. 1. The real-time emergency data may be collected by any device capable of determining the necessary information, and providing the necessary information to the public safety system server 102.

The public safety system server 102 may be further configured to extract a plurality of subsets of decision-making parameters based on the real-time emergency data using artificial intelligence (AI). The public safety system server 102 may be further configured to select a relevant subset from the plurality of subsets of decision-making parameters based on a request from a front-end interface. The request from the front-end interface may comprise a viewport request sent from a client (the public safety client application 104). The public safety system server 102 may be further configured to transmit the generated emergency response to the front-end interface. The public safety system server 102 may be further configured to generate the emergency response based on the relevant subset.

By way of example, one or more of the following AI-based functions and/or capabilities may be implemented into the system of the present invention:
  Adaptive instructions
  Human autonomy teaming
  Integration of resilience-based systems health model
  Sensing systems for advanced medical monitoring
  Augmented Decision-making process by a Decision-Making Assistant
  Intelligent mission planning support
  Non-Human Intelligent Collaborators Monitoring
  Tutoring and management of human/teams performance
  Language and multi-lingual support
  Operator behavioral monitoring for increasing performance.

The public safety client application 104 may be configured to receive an emergency request from a back-end server (such as the public safety system server 102). The public safety client application 104 may be further configured to render the emergency request in one or more layers. The plurality of layers may be real-time immersive and interactive 360 layers, user defined information interface layer, task-based disposition layer. The public safety client application 104 may be further configured to receive a response input on the rendered emergency response from the operator. The public safety client application 104 may be further configured to transmit the emergency response to the back-end server.

The overall platform may handle layers of customer-specific applications that enable interaction, visualization and/or configuration of functions, which with low latency cooperate with a scalable server-based system part that performs the major part of the data processing. The public safety system server 102 may be configured to transform, process, and execute upon the sensor data to identify different types of real time emergency data.

Figure 2:
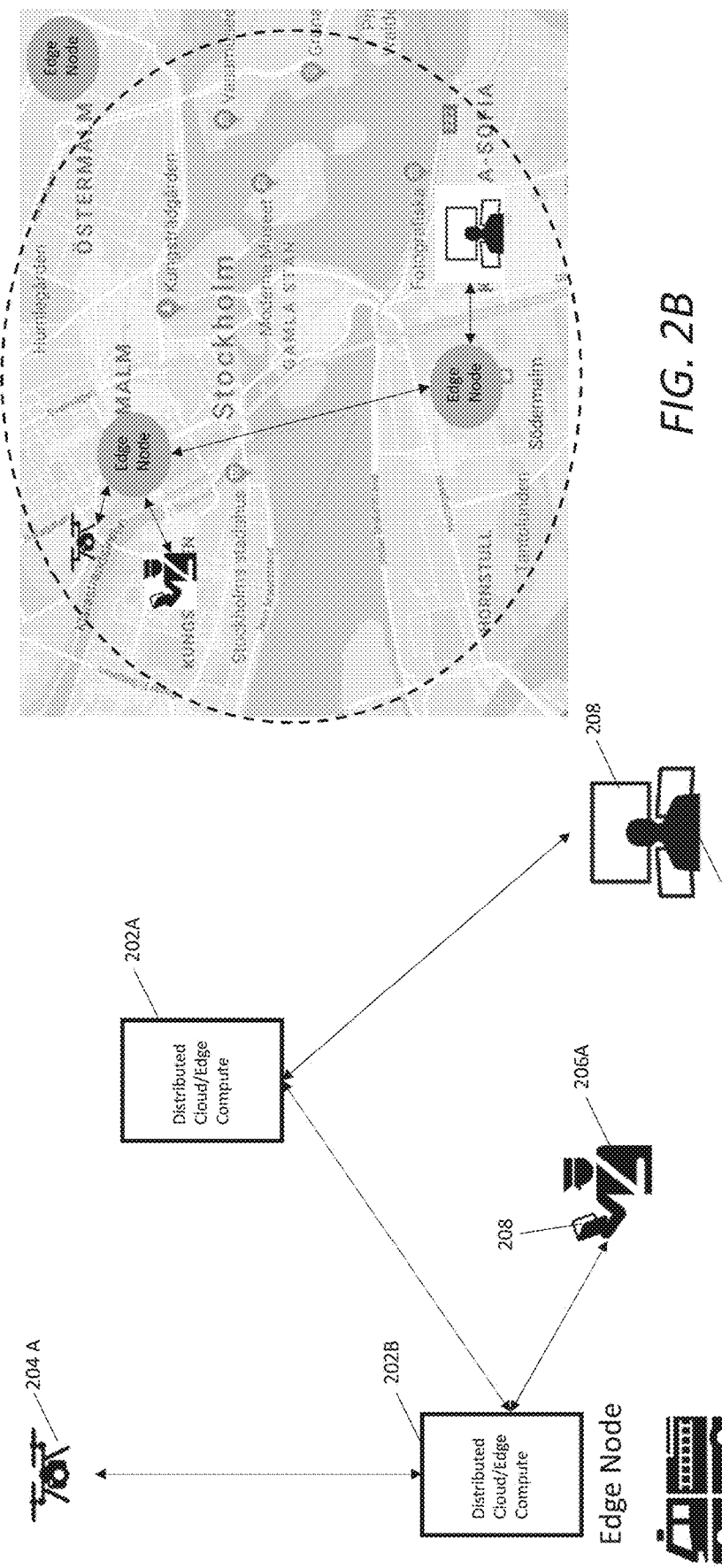
FIGS. 2A and 2B are schematic diagrams illustrating examples of network and/or computing technology that may be used to facilitate an emergency response system, in accordance with an example embodiment.

FIGS. 2A and 2B are schematic diagrams illustrating examples of network and/or computing technology that may be used to facilitate an emergency response system, in accordance with an example embodiment.

For example, FIGS. 2A and 2B may be described in conjunction with elements from FIG. 1. There is shown a distributed cloud 202A, a distributed cloud 202B, a drone 204A, a vehicle 204B, a user personnel 206A, a front-end system 208 (the public safety client application 104) and an operator 210. FIG. 2B explains the example embodiment of FIG. 2A on a map that shows different locations and boundaries for edge nodes.

The distributed cloud 202A and 202B of the emergency response system may be configured to obtain useful information from multiple information sources like the real time data from the video captured by the drone 204A and navigation data collected by the vehicle 204B. In some cases, the vehicle 204B may include a Mobile Edge Computing (MEC) node, which may support client applications at the edge with very low latency. The other information sources may be video streams, audio streams, e.g. from street view cameras, inside-building cameras, drones, helicopters, and/or specialized 360 degree cameras, various other sensor systems such as heat sensors and/or infrared (IR) sensors, map data, navigational information and/or guidance support data, traffic information, information on buildings and infrastructure, weather information, medical data and/or indications concerning on-site staff such as firemen or police officers.

The distributed cloud 202A and 202B of the emergency response system may be configured to effectively process large amounts of gathered information from different sources, such as the drone 204A and the vehicle 204B. The distributed cloud 202A and 202B may be configured to extract suitable subsets of information and technology for visualizing and/or otherwise presenting the extracted information to the user 206A and the operator 210.

The emergency response system may be used as a decision support system for enabling appropriate and/or well-informed emergency response decisions/actions for safety and security of the citizens. The system thereby enables protection functions for realizing a safer society.

Figure 3:
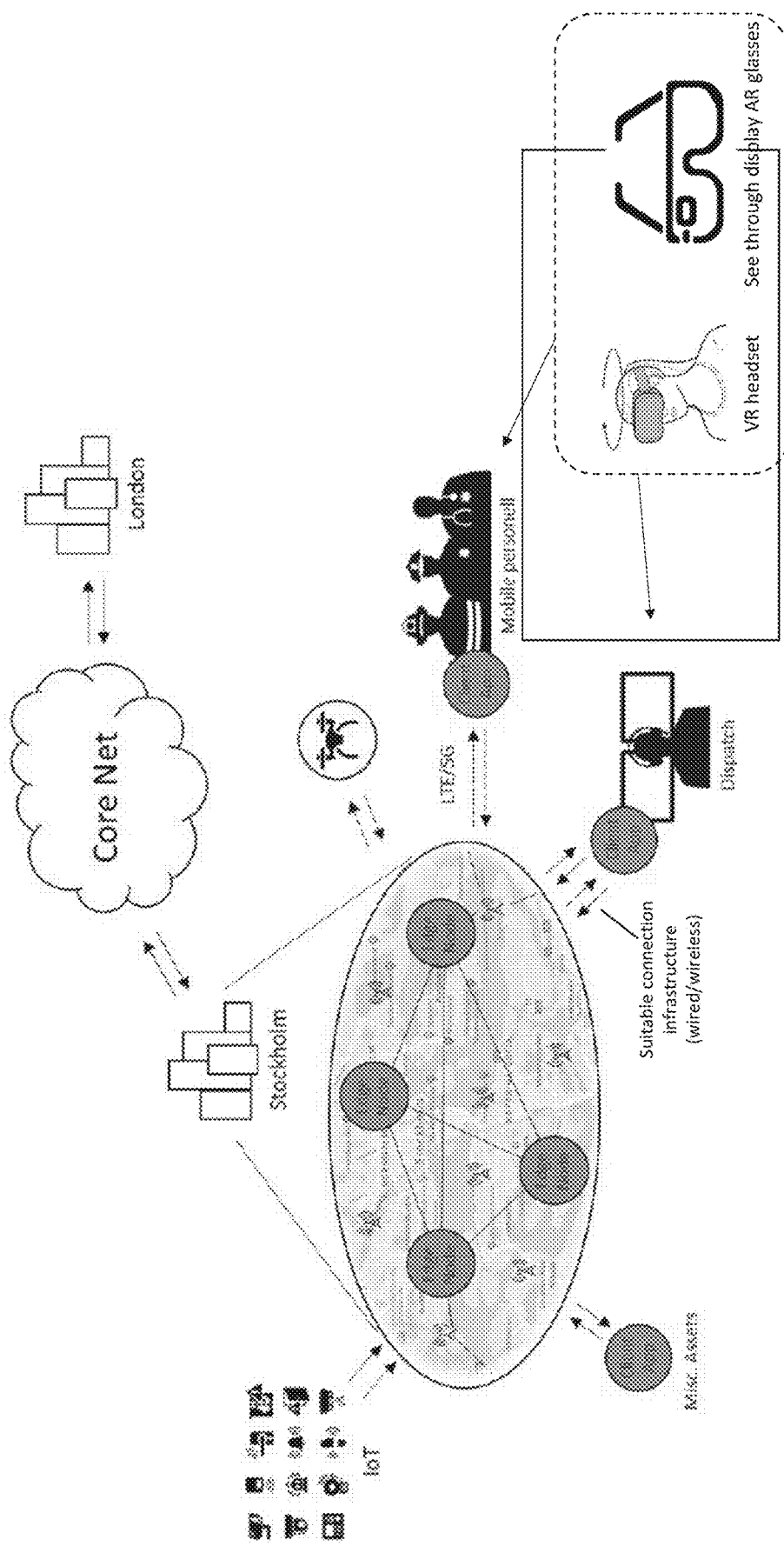
FIG. 3 a schematic diagram illustrating an example for enabling implementation of an emergency response system and method, in accordance with an example embodiment.

FIG. 3 a schematic diagram illustrating an example for enabling implementation of an emergency response system and method, in accordance with an example embodiment. By way of example, FIG. 3 may be described in conjunction with elements from FIG. 1, FIGS. 2A, and 2B.

There is shown a plurality of edge nodes in Stockholm, Internet of Things (IoT) devices, a drone, a plurality of client applications, core net communication network, LTE/5G communication network, edge nodes in London (edge nodes are not shown specifically), and a see-through display device and/or a VR/MR/AR headset (such as the VR headset and/or the see-through display AR glasses illustrated in FIG. 3) associated with client application.

An edge node of the plurality of edge nodes may be a computer that acts as an end user portal for communication with other nodes in cluster computing. Edge nodes are also sometimes called gateway nodes or edge communication nodes.

The plurality of client applications may be coupled to the plurality of edge nodes in London via the LTE/5G communication network. Operators and mobile personnel may be associated with the plurality of client applications. The see-through display devices may be used by the operators and mobile personnel to view the rendered emergency response on the client application which be an augmented reality, virtual reality and mixed reality.

Real time emergency data at the plurality of edge nodes may be collected from the IoT devices capable of determining the necessary information, and providing the necessary information to the plurality of edge nodes. The drone associated with the real time emergency data may function as a probe to capture the bird's eye view of a building on fire to generate the real time emergency data. The edge node may be configured to transform, process, and execute upon the real time emergency data to identify different types of real time emergency data.

In some embodiments, the edge nodes may be configured to obtain Internet-of-Things (IoT) related capabilities to users of the emergency response system disclosed herein. The IoT related capabilities may be used to provide smart city solutions by providing real time updates, big data analysis, and sensor-based data collection for providing navigation recommendation services and emergency response services. In a client-server based system, where the emergency/response system may at least partially be executed as a client application, the operator of the client system may request information from one or more of the edge servers (the one or more edge nodes) and/or cloud servers. The operators and/or the mobile personnel may receive at least some information from the one or more edge nodes without the need for any on-the-fly requests.

The client application and the one or more edge nodes may cooperate through bidirectional communication of information, e.g. via the 5G communication network from the edge node to the client application as well as from the client application to the edge node. In accordance with an embodiment, one or more edge nodes in Stockholm may communicate with the one or more nodes in London via the core network.

FIGS. 4A to 4E are schematic diagram illustrating examples of a system front-end and back-end, as well as exemplary front-end visualizations of an emergency response system, in accordance with an example embodiment.

As previously mentioned, an overall digital platform of the emergency response system may for example be based on two basic and linked system parts; the data back-end (such as the public safety system server 102 as described in FIG. 1) and the user front-end (such as the public safety client application 104 as described in FIG. 1). The data back-end plane may be configured to handle network communication to and/or from external information sources and systems. The data back-end plane may be configured to ensure synchronization of time-critical data, critical response and/or management and integration of third-party systems. Large amounts of data may be effectively handled by the back-end part. Data transfer protocols may be used for integration with the user front-end.

In accordance with an embodiment, the system front-end may be a client-implementation and serve as an interface towards and/or from the user(s). Preferably, such a client implementation is configured to be able to operate without requirements for heavy data processing considering enablement of using mobile and battery-powered units, and/or may use immersive visualization technology/tools. Immersive visualization technology may be an accessible, easy-to-use technology that turns 3D models into engaging visual experiences that users can explore. The overall platform may handle layers of customer-specific applications that enable interaction, visualization and/or configuration of functions, which with low latency cooperate with a scalable server-based system (back-end) part that performs the major part of the data processing. The client side (front-end) and the back-end may cooperate through bidirectional communication of information, from the back-end to the client as well as from the client to the back-end. The system front-end provides user centric design, capability based, and flexible task allocation interface. The system front-end provides task-based layer disposition. The emergency response system may effectively extract suitable subsets of the overall information for presentation to a user/operator. By way of example, the information can be extracted and possibly even requested and/or presented based on the role and/or profile of the user/operator.

The emergency response system may provide a selectable number of technological means, such as, but not limited to, Virtual Reality (VR), Augmented Reality (AR), Mixed Reality (MR) headsets and/or computer screens or monitors (preferably large High Definition screens) for presentation of the selected information to the user/online operator, such as audio and video streams (preferably with zooming and/or direction selectivity), maps, weather and infrastructure presentations, and/or traffic information. In accordance with an exemplary embodiment, the proposed technology may utilize the VR/MR/AR headsets for presentation. In a particular example, the information presentation sub-system employs advanced head worn see-through imagery displays/glasses and immersive VR/MR/AR technologies, and utilizes head-tracking for providing a transparent canopy effect for the user in a concise and timely form to facilitate fast, yet effective decision making. The emergency response system may thus employ visualization technology that provides an immersive overview of the situation, possibly including a superposition of useful information such as geo-positioned information and graphics.

Figure 4A:
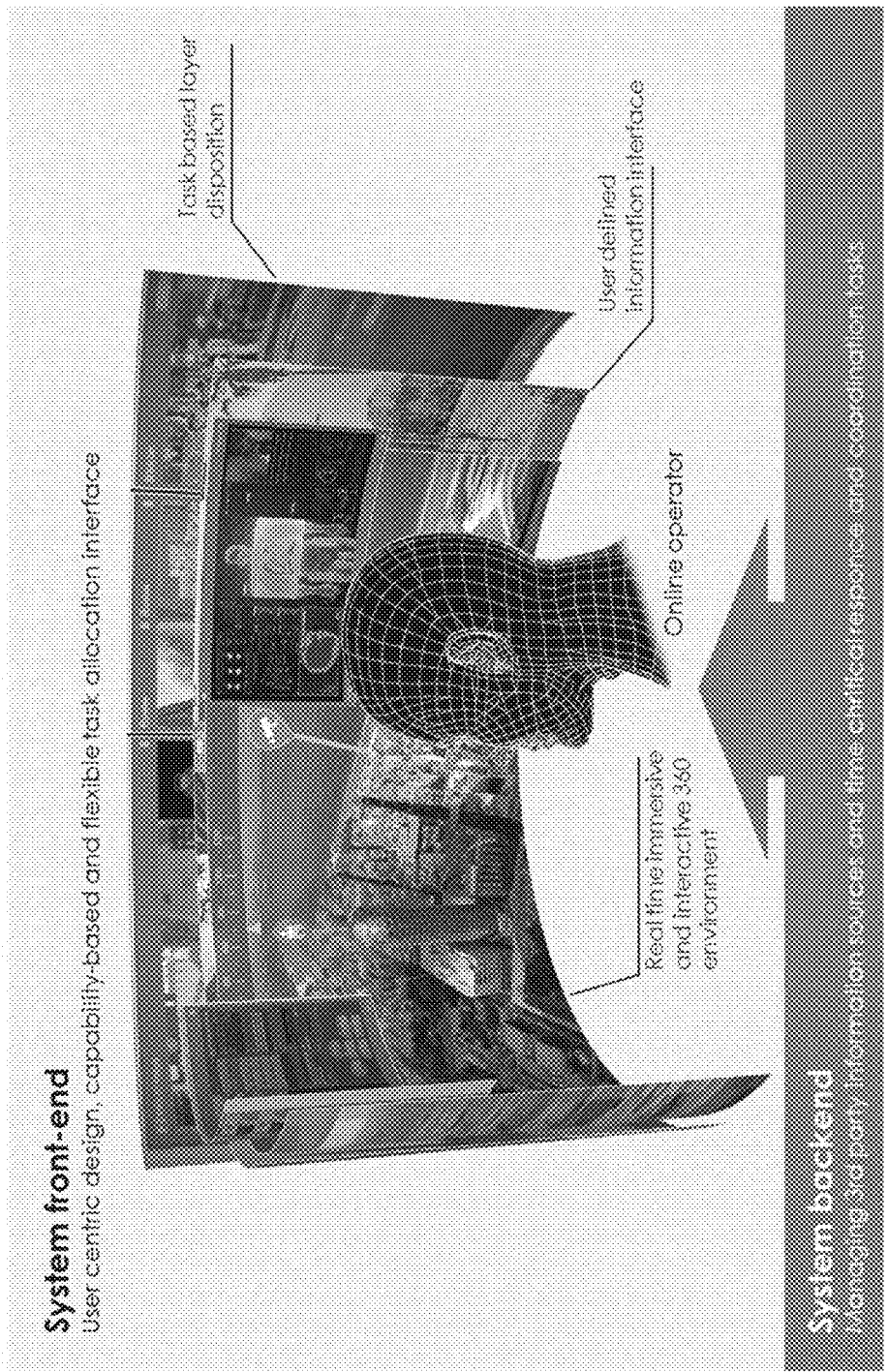
Figure 4B:
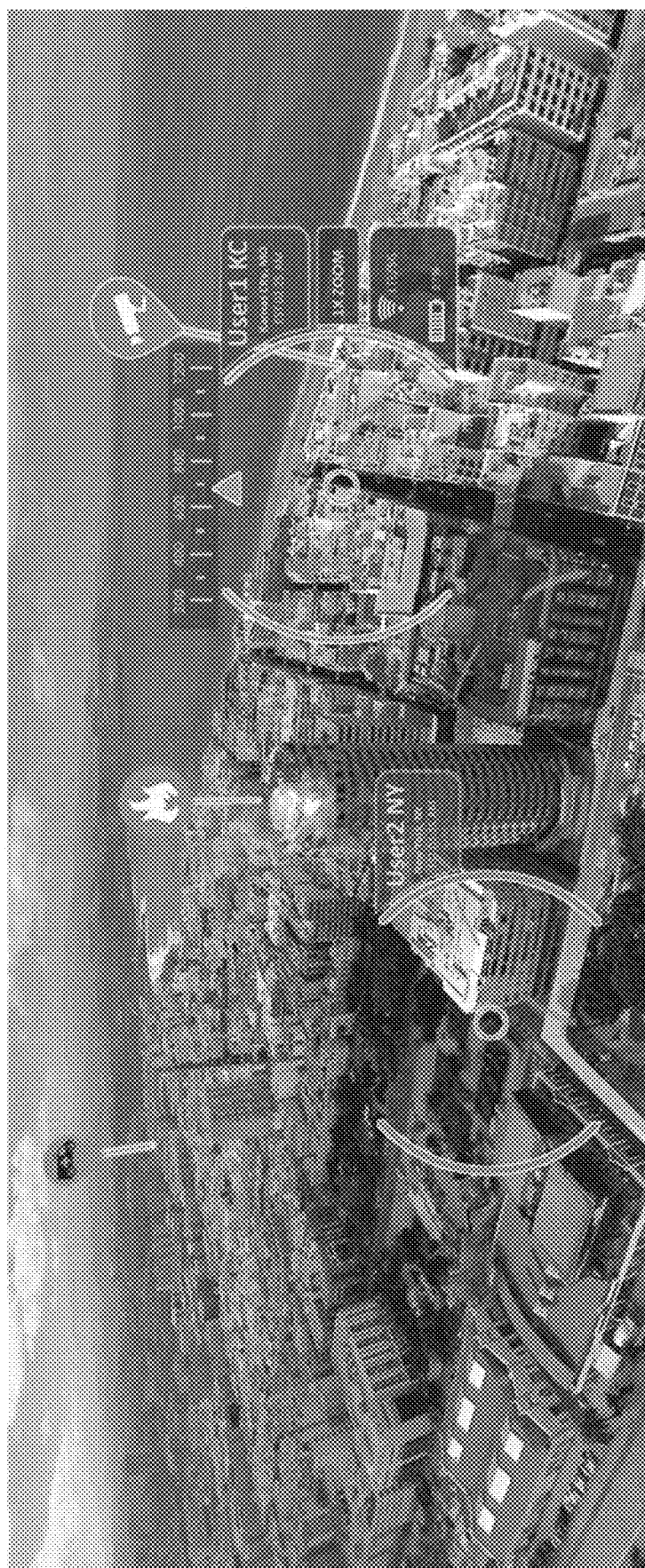

FIG. 4B illustrates a display on a front-end of the emergency response system, of an exemplary emergency situation, in accordance with an embodiment.

With reference to FIG. 4B, the external information source (camera-equipped drone) may transmit video data where a building complex is on fire. The digital platform (e.g. the public safety system server 102) allows the video data from the drone to be collected, transferred and/or combined with other data for presentation to one or more users or operators, normally superimposed together with information to support enhanced perception and understanding of the situation and the surroundings. For example, detailed information about the building in which the fire is raging, the severity and extension of the fire, information about nearby buildings at risk, traffic information (e.g. traffic congestions), available fire squad units and their positions, wind conditions, street views, and so forth. Through the back-end communication system and network, it is also possible to connect other operators and/or supporting personnel, on-site and/or off-site. The network function may enable cooperative teamwork between various individual users/operators that can see and hear the same information, thereby optimizing the possibilities of building or forming a common overview of the situation and minimizing the risk for misinterpretations. Therefore, external sensors and cameras may be used for rendering and visualization of the emergency situation.

Figure 4C:
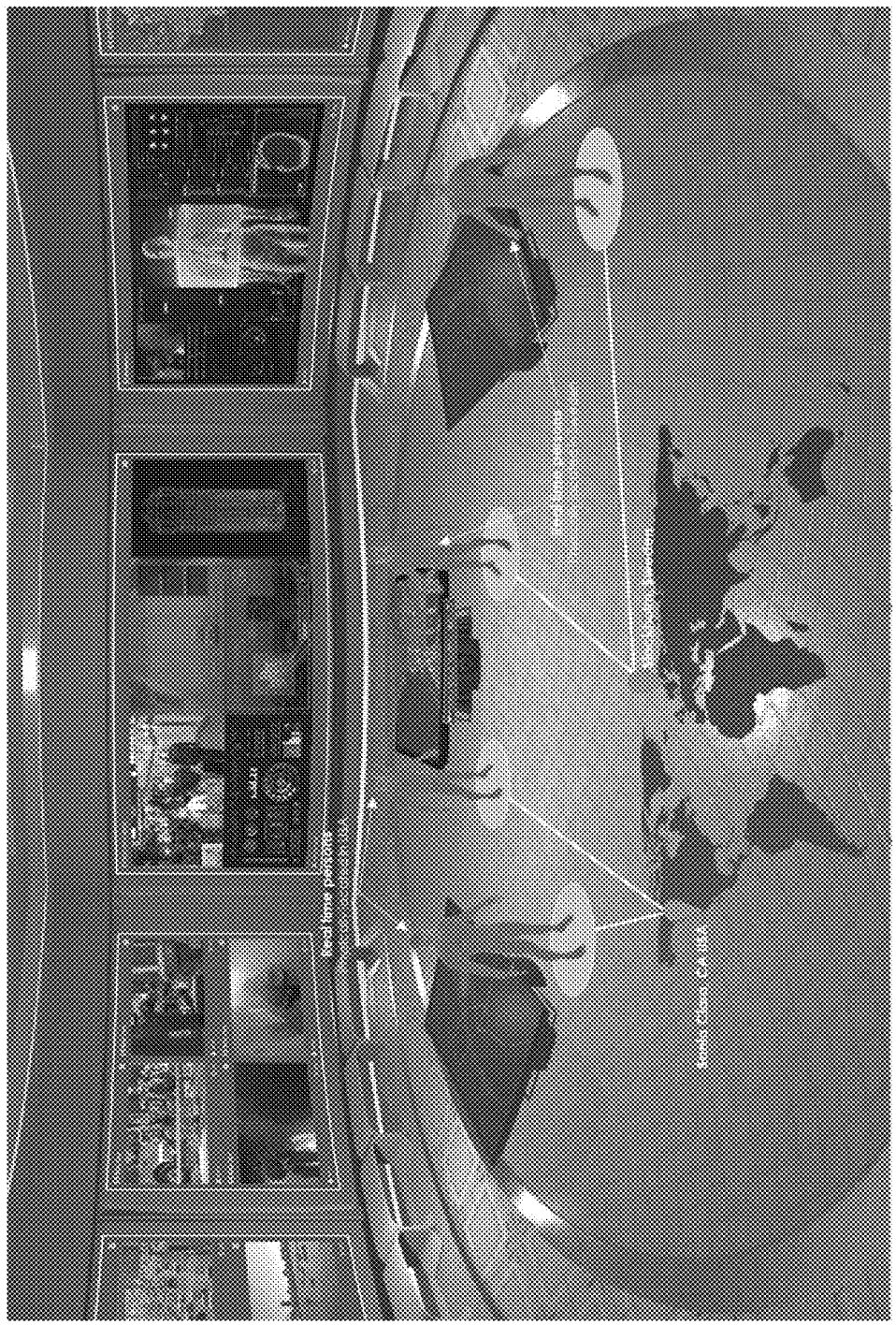

FIG. 4C exemplarily illustrates a common front-end (client) working area of the emergency response system that may be formed as a virtual environment where individuals can cooperate from a distance based on visualizing the interacting users/operators in real-time.

With reference to FIG. 4C, four individuals out of which two individuals may be located in USA and the remaining two may be located in Sweden. The four individuals may cooperate from a distance and their physical appearance, movements and gestures and speech conversations may be rendered. Such interaction amongst users/operators may be very close to real-world physical meetings, and plays an important role in optimizing coordination and decision-making from a control and command perspective. For example, the Intel Realsense camera technology may be used to capture or "scan" the users/operators and transfer or "teleport" the video/image information and 3D data of each user/operator in real-time or near real-time (e.g. photo realistically and with normal body proportions) into a virtual reality environment in which the users/operators may interact in the same virtual location.

Accordingly, there are at least two types of visualization; one type using input from external sensors and cameras for rendering and visualization of the emergency situation, e.g. as shown in FIG. 4B, and another type for visualization of the users/operators of the actual system to allow natural interaction and communication even though the users are not co-located, e.g. as shown in FIG. 4C.

Figure 4D:
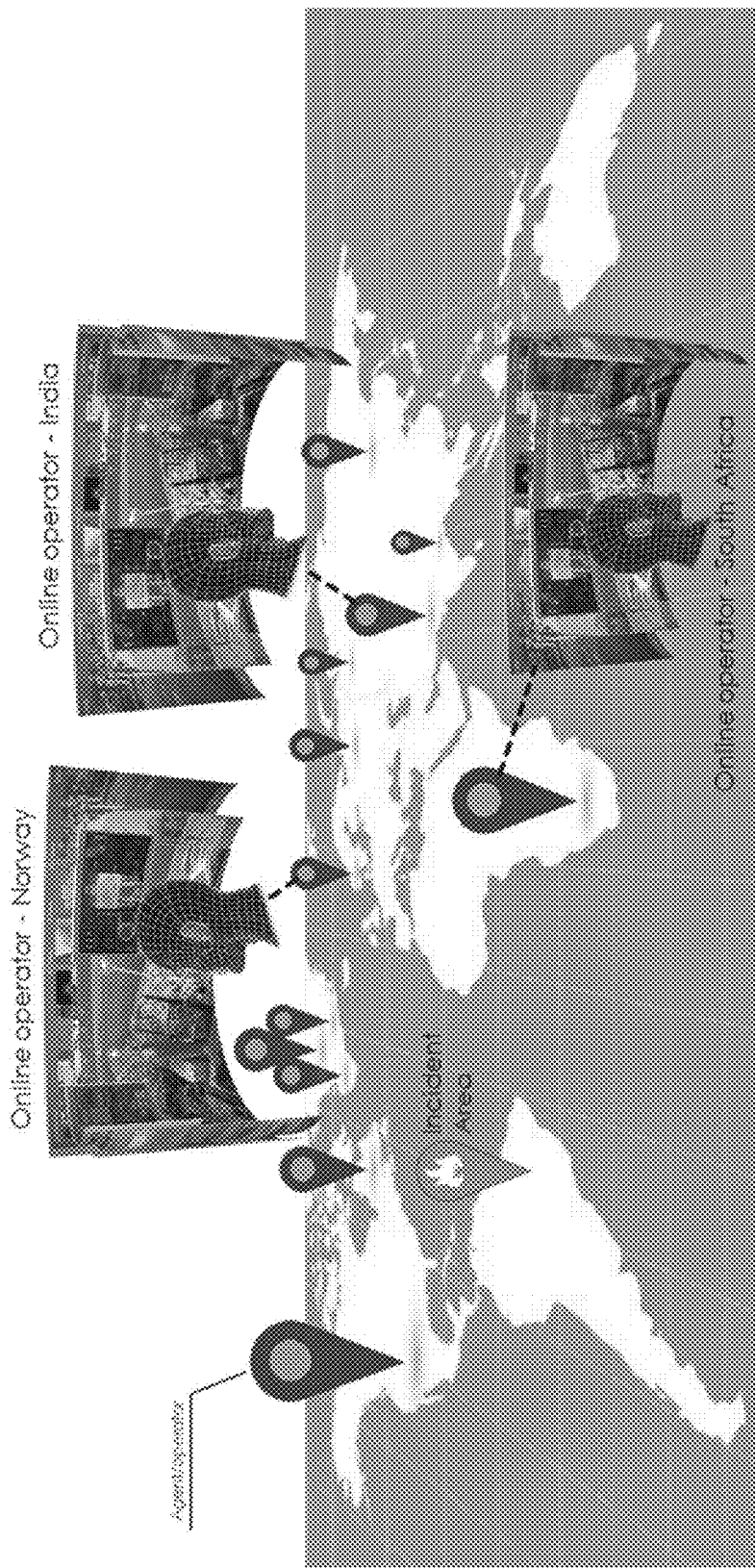

FIG. 4D exemplarily illustrates a schematic diagram to show that three operators may access the emergency response system from three different locations of the world, in accordance with an embodiment of the disclosure.

With reference to the FIG. 4D, three operators at three different locations, viz., Norway, India and South Africa, may be able to access the same digital platform of the emergency response system to discuss the incident that has happened in South America. The operators may cooperate and interact in the same virtual working area in real time or near real time to handle a common emergency situation or a common security situation together with joined resources.

Such a system may allow, via network connection, interaction between individual users/operators independent of their actual location. In this case, the emergency response system may provide a common and virtual working area that is easily and instantly accessible, and where the geographical position of the user/operator does not matter.

FIG. 4E is a schematic diagram illustrating examples of information such as video, images, graphics, and other data that may be gathered and presented to a front-end user of the emergency response system.

By way of example, when one or more omnidirectional cameras (CAM) such as 180/360 degrees cameras with high resolution provides one or more (possibly parallel) streams of video data, for example from a drone or a fixed position, this information may be used for providing a full 180/360 degree imagery display using a VR/MR/AR headset. For more information on omnidirectional cameras and/or 180/360-degree cameras, reference can be made, e.g., to our co-pending PCT application PCT/SE2018/050340, the contents of which are incorporated herein in entirety. As a result, the user experience may be enhanced. Further, the user/operator of the emergency response system may be able to take an informed decision.

More specifically, a viewport request related to the omnidirectional camera may, for example, be sent from the client system (the public safety client application 104) managed by the operator to the public safety system server 102 through which the video stream may be relayed, and the public safety system server 102 may then distribute the video information corresponding to the viewport request.

Figure 5:
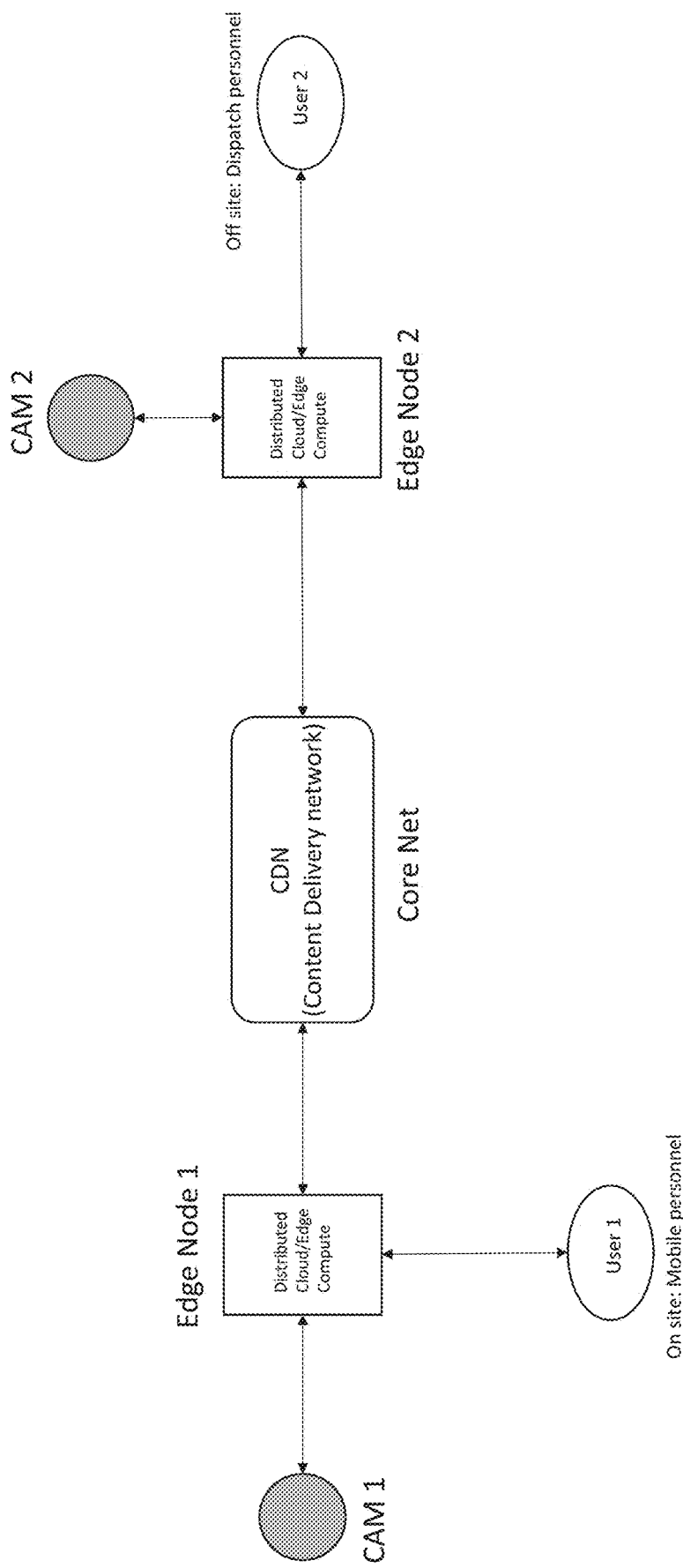
FIG. 5 is a schematic diagram illustrating an example of how video data from a camera may be transferred and optionally processed for presentation to one or more users, in accordance with an embodiment.

FIG. 5 is a schematic diagram illustrating an example of how video data from a camera may be transferred and optionally processed for presentation to one or more users, in accordance with an embodiment.

There is shown a first camera source (such as an omnidirectional camera) which may be referred as CAM 1, a second camera source (such as an omnidirectional camera) which may be referred as CAM 2, a first edge node (referred as Edge Node 1), a second edge node (referred as edge node 2), a content delivery network, a first user and a second user. The first user may correspond to a mobile personnel present on site. The second user may correspond to dispatch personnel who are present off site. The edge node 1 may be communicatively coupled to edge node 2, via the content delivery network.

In operation, the edge node 1 may be configured to obtain, real-time emergency data from at least one input device, such as CAM 1. The real-time emergency data may comprise one or more of video, audio, IR data, map data, navigational data, guidance support, or weather information. In accordance with an embodiment, the real-time data collected from the CAM 1 may be referred as sensor data. In accordance with an embodiment, glass-to-glass latency between CAM 1 and User 1 may be low because stream from CAM 1 is distributed via closest edge node, that is, the edge node 1 in FIG. 5. The real-time emergency data may be collected by the edge node 1 to determine the necessary information and providing the necessary information to the user 1.

The user 1 may be associated with a front-end of the emergency response system where specific applications enable interaction, visualization and/or configuration of functions, which with low latency cooperate with a scalable server-based system part that performs the major part of the data processing. The edge node 1 may be configured to transform, process, and execute upon the data received from the CAM 1 to identify real time emergency data.

The edge node 1 and edge node 2 may be configured to ensure synchronization of time-critical data, critical response and/or management and integration of third-party systems (CAM 1 and CAM 2). Data transfer protocols may be used for integration with the edge node 1 and the edge node 2.

The user 1 on front-end and the edge node 1 may cooperate through bidirectional communication of information, from the edge node 1 to the user 1 on front-end as well as from user 1 on front-end to the edge node 1. The front-end may provide for the user 1 a user centric design, capability based, and flexible task allocation interface.

The user 1 and the user 2 at two different locations, viz., on-site location and the off-site location may be able to access the same digital platform of the emergency response system to discuss the incident that has happened. The user 1 and the user 2 may cooperate and interact in the same virtual working area in real time or near real time to handle a common emergency situation or a common security situation together with joined resources.

Figure 6A:
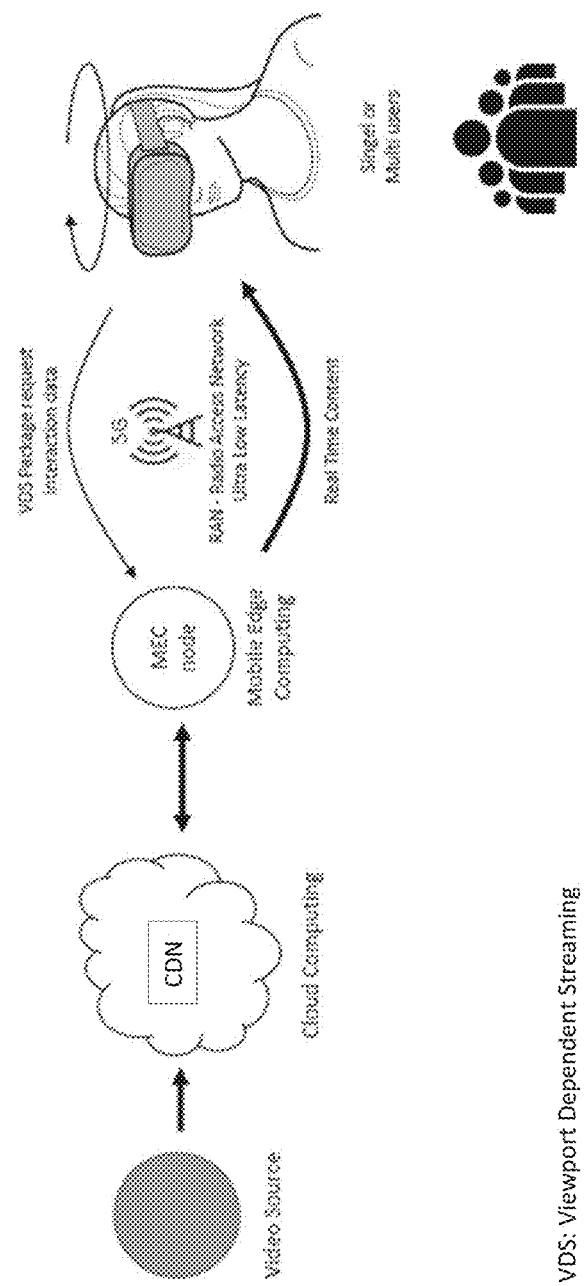
FIGS. 6A and 6B are schematic diagrams illustrating examples of how video data from a video source may be transferred and optionally processed for presentation on a display device associated with the front-end of the emergency response system.
Figure 6B:
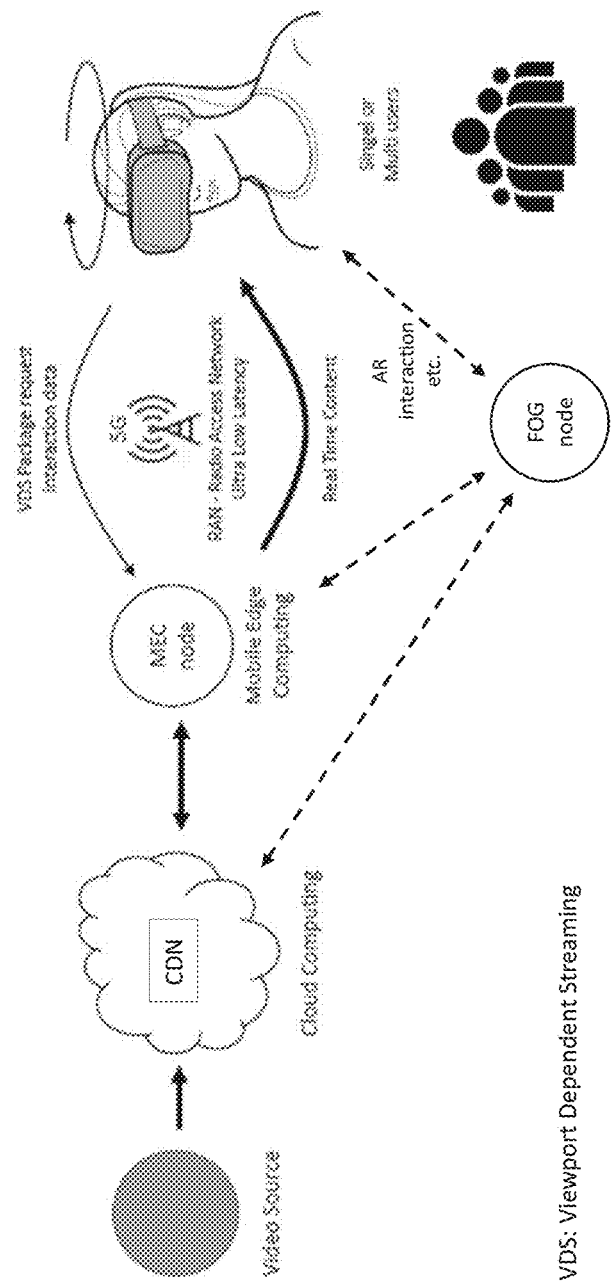

FIGS. 6A and 6B are schematic diagrams illustrating examples of how video data from a video source may be transferred and optionally processed for presentation on display device associated with the front-end of the emergency response system.

With reference to FIG. 6A, there is shown a video source, a content delivery network, a Mobile Edge Computing (MEC) node, a radio access network, such as 5G or LTE network which has ultra-low latency, one or more users, such as a user and a see through display device associated with the user. The see-through display device may include VR/MR/AR headset.

The MEC node may obtain real time emergency data from the video source via the content delivery network. By way of example, when one or more omnidirectional cameras (CAM) such as 360 degrees cameras with high resolution provides one or more (possibly parallel) streams of video data, for example, from a camera of a drone or a fixed position, the information may be used for providing a full 360 degree imagery display using the VR/MR/AR headset, thereby improving the user experience and allowing high quality decision to be made by the user/operator of the emergency response system that includes the MEC node and a front-end interface associated with the see through display device.

The MEC node may generate the emergency response based on a request received from the user. More specifically, a viewport request related to the omnidirectional camera of the video source may for example be sent from the client system managed by the user to the MEC node through which the video stream may be relayed. The MEC node may then distribute the video information corresponding to the viewport request. That is, the MEC node may be configured to transmit the generated emergency response to the front-end interface. The video information may be real time content. The radio access network, which may for example be a 5G network, may have low latency. Latency may be the time it takes for something to propagate in a system.

With reference to FIG. 6B, there is shown a video source, a content delivery network, a mobile edge computing (MEC) node, a radio access network, such as 5G or LTE network which has ultra-low latency, one or more users, such as a user and a see through display device associated with the user, and a fog node. The see-through display device may include VR/MR/AR headset.

The fog node may interact with the CDN, MEC node and/or the front-end interface associated with the user. The fog node may be a mini cloud located at an edge of the network, implemented through a variety of edge devices interconnected mostly by wireless technologies. The IoT related services may challenge the performance of the cloud computing, such as high communication latency, privacy gaps and related traffic loads of networks that connect end users with cloud computing. Such challenges may be addressed by the fog node. Edge devices, sensors, and applications may generate an enormous amount of data on a daily basis. Though sending raw data over the internet can have privacy, security and legal implications. In the Fog node, the processing takes place in a smart device close to the source.

Figure 7A:
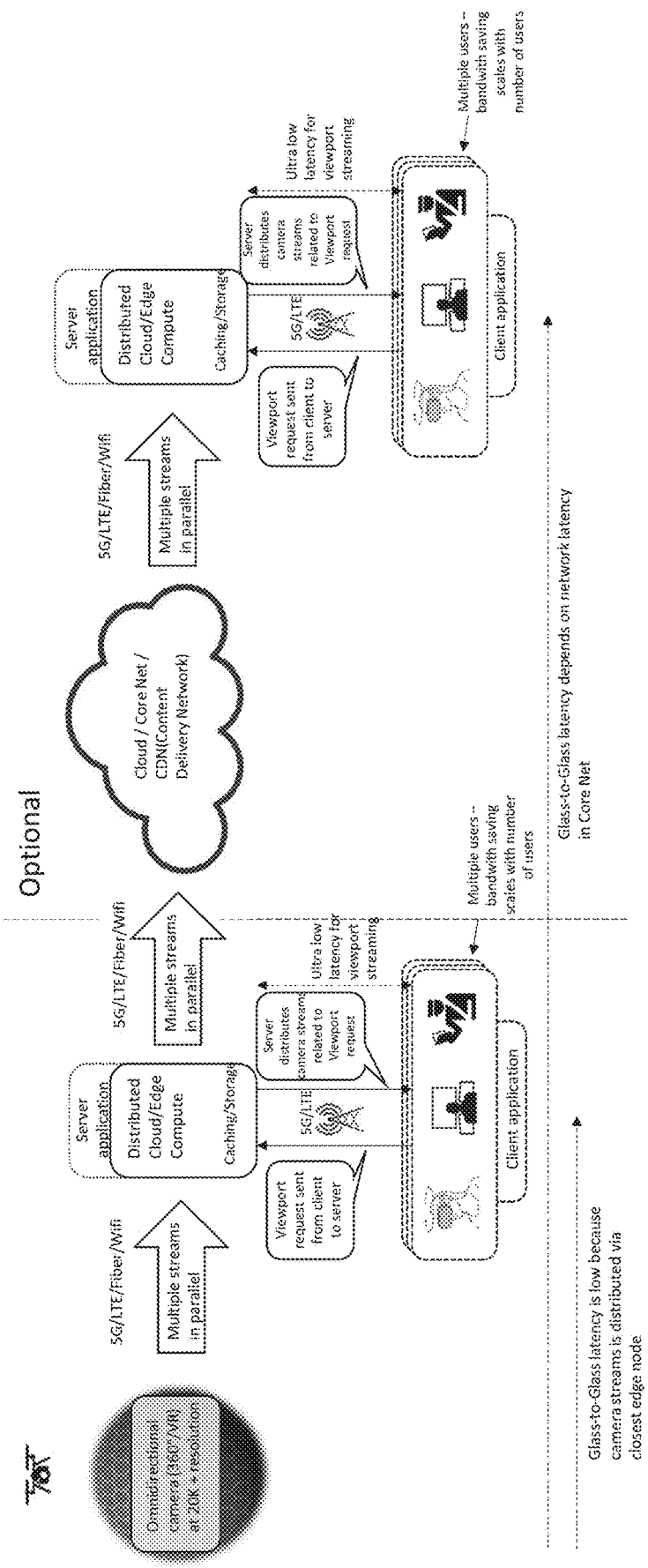
FIG. 7A is a schematic diagram illustrating an example of a network environment and architecture of an emergency response system, specifically illustrated as a system that among other input data obtains data from an omnidirectional camera, in accordance with an example embodiment.

FIG. 7A is a schematic diagram illustrating an example of a network environment and architecture of an emergency response system, specifically illustrated as a system that among other input data obtains data from an omnidirectional camera, in accordance with an example embodiment.

The video data from the omni-directional camera source may be transferred and optionally processed for presentation to one or more users by the emergency response system.

By way of example, when one or more omnidirectional cameras (CAM) such as 360 degrees cameras with high resolution provides one or more (possibly parallel) streams of video data, for example from a drone or a fixed position, this information may be used for providing a full 360 degree imagery display using a VR/MR/AR headset, thereby improving the user experience and allowing informed decision to be made by the user or operator of the emergency response system.

Figure 7B:
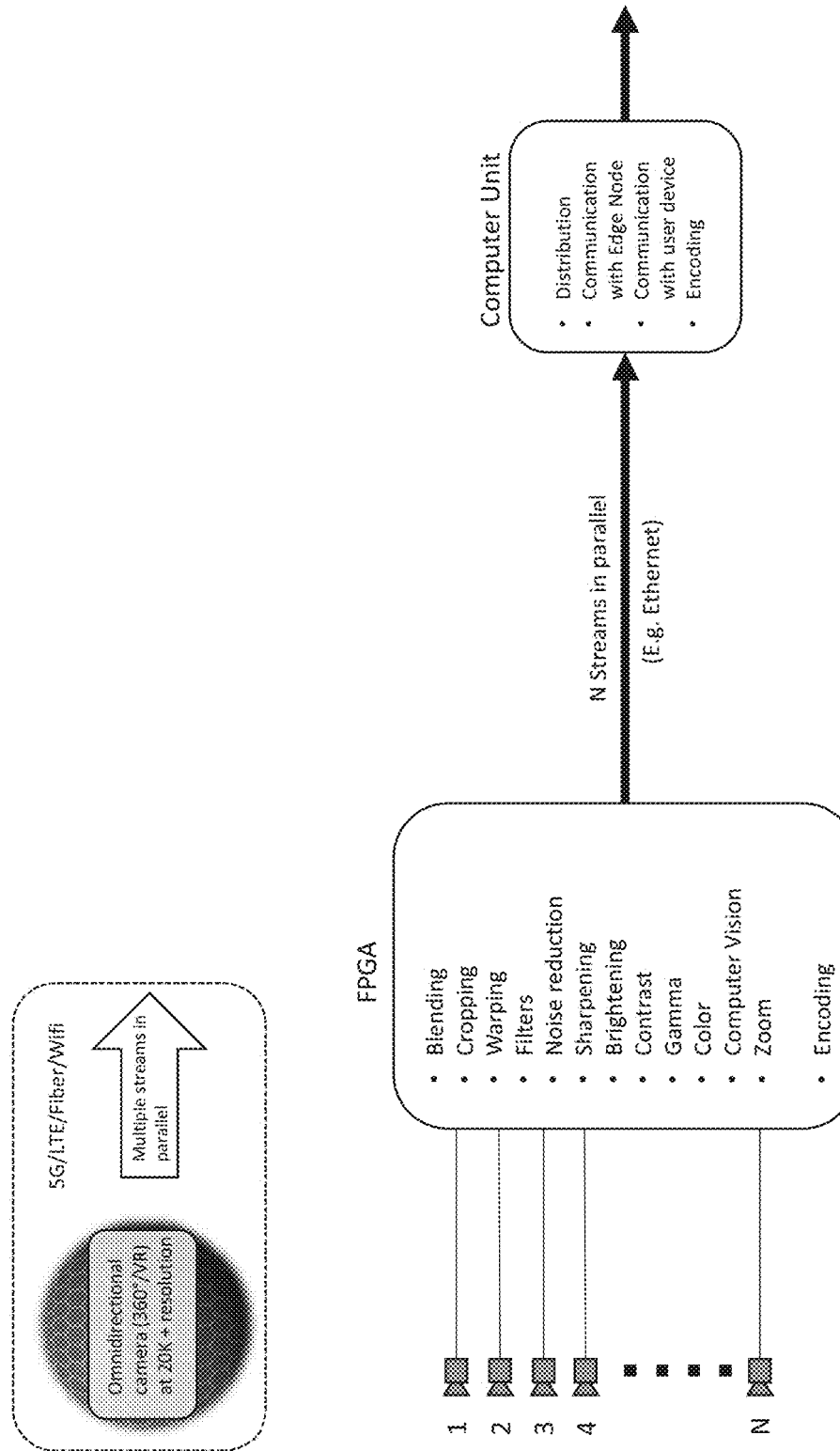
FIG. 7B is a schematic diagram illustrating an example of video processing and video streaming according to an embodiment.

FIG. 7B is a schematic diagram illustrating an example of video processing and video streaming according to an embodiment. The video feed from the omnidirectional camera may be processed by different operations, such as, blending, cropping, warping, noise reduction, sharpening, brightening, contrast, color, encoding and computer vision. The processed video feed may be communicated to edge node, user device etc. via a communication protocol such as, Ethernet.

Figure 8:
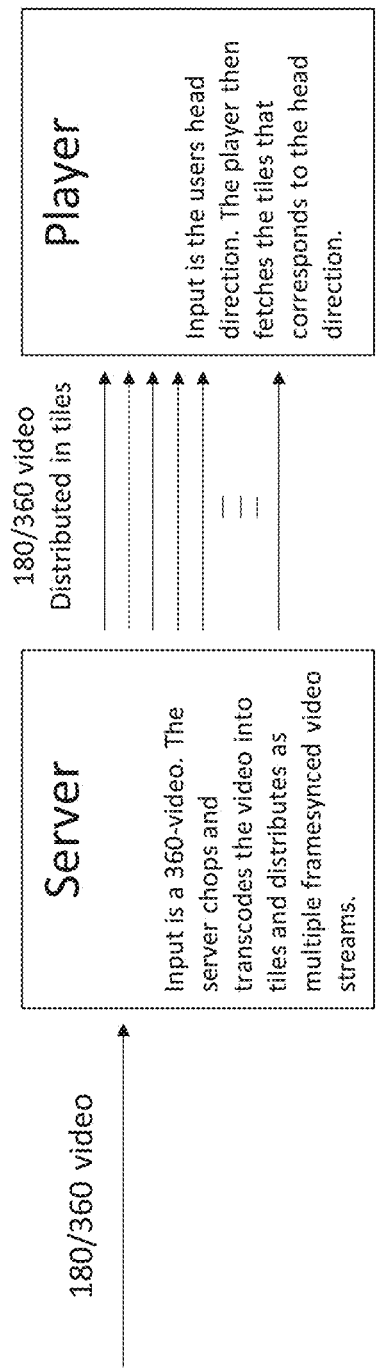
FIG. 8 is a schematic diagram illustrating traditional tile-based streaming of video from a video source such as a camera, via a server to a player on the user side (front-end node) of the emergency response system, in accordance with an example embodiment.

FIG. 8 is a schematic diagram illustrating traditional tile-based streaming of video from a video source such as a camera, via a server to a player on the user side (front-end node) of the emergency response system, in accordance with an example embodiment.

The server receives 180/360 video as input, and the server chops and transcodes the video into tiles and distributes the thus transcoded tile-based video as multiple, possibly frame-synchronized video streams. The player receives the video streams, and may use the head direction (obtained from a head-tracking device, e.g. associated with a VR/MR/AR headset) of the user as additional input. The player then selects and fetches the tiles that correspond to the head direction for output and presentation to the user.

Figure 9:
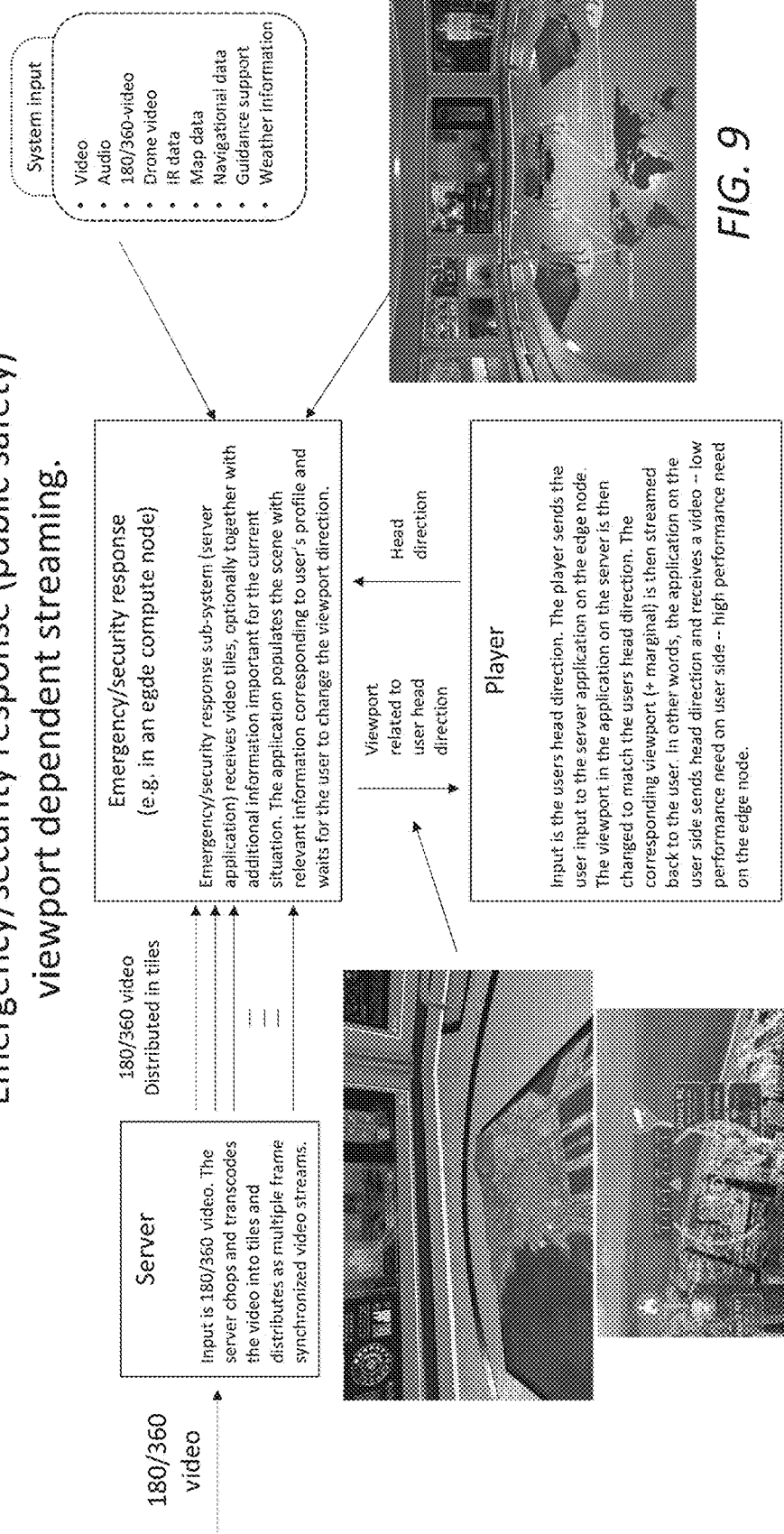
FIG. 9 is a schematic diagram illustrating an example of novel streaming of video data from a camera, via a server and additionally via an emergency response sub-system, for viewport dependent streaming to a player on the user side (front-end) of the emergency response system, in accordance with an example embodiment.

FIG. 9 is a schematic diagram illustrating an example of novel streaming of video data from a camera, via a server and additionally via an emergency response sub-system, for viewport dependent streaming to a player on the user side (front-end) of the emergency response system, in accordance with an example embodiment.

For example, the emergency/security response sub-system (e.g. back-end part), such as a software-based application executing on an edge compute server, may be configured to receive video tiles from a (video) server, and optionally additional input such as one or more of the so-called system input shown as examples in FIG. 9. By way of example, the application may then be configured to digitally populate the scene to be presented with relevant video and/or other data depending on and/or corresponding to head direction and/or additional profile information of one or more individual users.

Normally, the player, which may be executed as a client application, is configured to obtain information representative of the head direction of a user. By way of example, this may be obtained from a head-tracking device, e.g. associated with a VR/MR/AR headset employed by the user. The player sends the information about the head direction to the emergency/security response sub-system, which is configured to adapt viewport based on the head direction and to transfer the corresponding viewport-based video and/or additional data to the player for rendering. In other words, the viewport in a server application of the emergency/security response sub-system is adapted to match the user's head direction, and the corresponding viewport is then streamed back to the user/player for rendering, i.e. the application on the user side sends information about the head direction and receives corresponding video and/or additional data according to the user profile.

Figure 10:
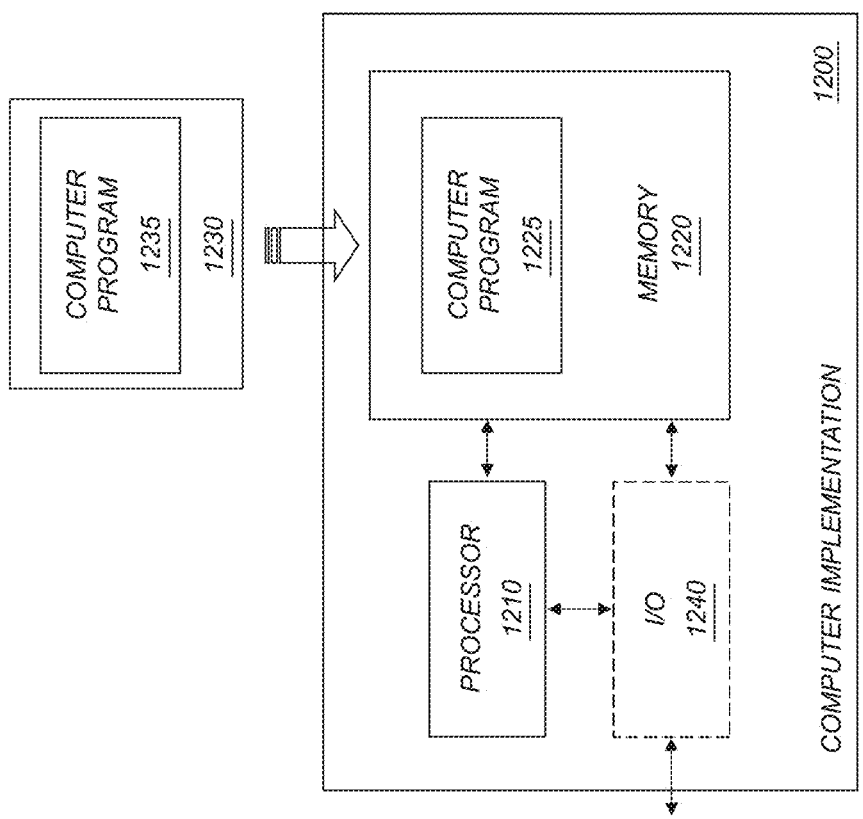
FIG. 10 is a block diagram illustrating an example of a computer-implementation 100 according to an embodiment.

FIG. 10 is a block diagram illustrating an example of a computer-implementation 1200 according to an embodiment.

In this particular example, at least some of the steps, functions, procedures, modules and/or blocks described herein are implemented in a computer program 1225; 1235, which is loaded into the memory 1220 for execution by processing circuitry including one or more processors 1210. The processor(s) 1210 and memory 1220 are interconnected to each other to enable normal software execution. An optional input/output device 1240 may also be interconnected to the processor(s) 1210 and/or the memory 1220 to enable input and/or output of relevant data such as input parameter(s) and/or resulting output parameter(s). The term 'processor' should be interpreted in a general sense as any system or device capable of executing program code or computer program instructions to perform a particular processing, determining or computing task. The processing circuitry including one or more processors 1210 is thus configured to perform, when executing the computer program 1225, well-defined processing tasks such as those described herein. The processing circuitry does not have to be dedicated to only execute the above-described steps, functions, procedure and/or blocks, but may also execute other tasks.

The processor 1210 may comprise suitable logic, circuitry, and interfaces that may be configured to execute instructions stored in the memory 1220. The processor 1210 may be configured for generating the emergency data of the emergency response system. Examples of the processor 1210 may be an Application-Specific Integrated Circuit (ASIC) processor, a Complex Instruction Set Computing (CISC) processor, a central processing unit (CPU), an Explicitly Parallel Instruction Computing (EPIC) processor, a Very Long Instruction Word (VLIW) processor, and/or other processors or circuits, including also a Digital Signal Processor (DSP), a Graphics Processing Unit (GPU), and/or any suitable programmable logic device such as a Field Programmable Gate Array (FPGA) device and a Programmable Logic Controller (PLC) device. The processor 1210 may implement a number of processor technologies known in the art such as a machine learning model, a deep learning model, such as a recurrent neural network (RNN), a convolutional neural network (CNN), and a feed-forward neural network, or a Bayesian model. As such, in some embodiments, the processor 1210 may include one or more processing cores configured to perform independently. A multicore processor may enable multiprocessing within a single physical package. Additionally, or alternatively, the processor 1210 may include one or more processors configured in tandem via the bus to enable independent execution of instructions, pipelining and/or multithreading. Additionally, or alternatively, the processor 1210 may include one or processors capable of processing large volumes of workloads and operations to provide support for big data analysis. However, in some cases, the processor 1210 may be a processor specific device (for example, a mobile terminal or a fixed computing device) configured to employ an embodiment of the disclosure by further configuration of the processor 1210 by instructions for performing the algorithms and/or operations described herein. By way of example, artificial intelligence modules, e.g. based on supervised learning, unsupervised learning and/or reinforcement learning, may be implemented in any of the above-mentioned processing structures. More information on Reinforcement Learning can be found, e.g. in "Reinforcement Learning: An Introduction" by Sutton and Barto, 2018.

In some embodiments, the processor 1210 may be configured to provide Internet-of-Things (IoT) related capabilities to users of the emergency response system disclosed herein. The IoT related capabilities may in turn be used to provide smart solutions by providing real time updates, big data analysis, and sensor-based data collection for providing navigation services.

The memory 1220 may comprise suitable logic, circuitry, and interfaces that may be configured to store a machine code and/or instructions executable by the processor 1210. The memory 1220 may be configured to store information including processor instructions for generating the emergency data of the emergency response system. The memory 1220 may be used by the processor 1210 to store temporary values during execution of processor instructions. The memory 1220 may store the emergency data. Examples of implementation of the memory 1220 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O interface 1240 may comprise suitable logic, circuitry, and interfaces that may be configured to operate as an I/O channel/interface between different operational components of the emergency response system or other devices in the network environment. The I/O interface 1240 may facilitate an I/O device (for example, an I/O console) to receive an input (e.g., live video feed from a camera) and present an output to the front-end of the emergency response system. The I/O interface 1240 may include various input and output ports to connect various I/O devices that may communicate with different operational components of the emergency response system.

In a sense, the emergency response system may be regarded as a system integration for emergency/security response and/or public safety including technology for quickly and effectively gathering useful information from multiple information sources, technology for effectively processing large amounts of gathered information and for extracting suitable subsets of information and technology for visualizing and/or otherwise presenting the extracted information to the user/operator. The emergency response system may also utilize artificial intelligence-based technology for decision support, information extraction, classification and/or other information processing such as image processing (e.g. for detecting people from background in video and image streams and/or even for face recognition). The emergency response system integration may be used as a decision support system and/or command control center for enabling appropriate and/or well-informed emergency/security response decisions and/or actions. The system thereby enables protection functions for realizing a safer society.

The proposed technology also provides a computer-implemented demonstration system of such an emergency response system. For example, the demonstration system may be based on the real emergency response system or selected parts thereof, while using input data relating to a fictive emergency and/or security situation or an emergency and/or security situation that has already occurred. Such a computer-implemented demonstration system may for example be implemented as schematically illustrated in FIG. 10.

The proposed technology also provides a computer-implemented analysis system for such an emergency response system. For example, the analysis system may be based on the real emergency response system or selected parts thereof, while using input data relating to an emergency and/or security situation that has already occurred. This may for example be a re-play of the overall emergency situation or selected parts thereof with operator-based analysis and/or automated analysis based on statistical analysis and/or artificial intelligence. Such a computer-implemented analysis system may for example be implemented as schematically illustrated in FIG. 10.

The proposed technology may also be applied to infotainment, digital entertainment, coverage of live sports events and/or live computer gaming or similar e-sports. Accordingly, any combination of the above-described technical features may be implemented as a corresponding system for infotainment, digital entertainment, coverage of live sports events and/or live gaming or similar e-sports.

In general, the proposed technology concerns methods, systems and sub-systems for coverage and/or display of live events in general, including emergency and/or security situations, as well as live sports events including also e-sports, and other events. For example, video data from cameras covering live events may be relayed to a server system, which can communicate with a client application for rendering requested viewports to an end-user, in the manner described herein.

Moreover, this invention can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions.

The software may be realized as a computer program product, which is normally carried on a non-transitory computer-readable medium, for example a CD, DVD, USB memory, hard drive or any other conventional memory device. The software may thus be loaded into the operating memory of a computer or equivalent processing system for execution by a processor. The computer/processor does not have to be dedicated to only execute the above-described steps, functions, procedure and/or blocks, but may also execute other software tasks.

By way of example, there is provided a computer-program product comprising a non-transitory computer-readable medium having stored thereon a computer program comprising instructions, which when executed by at least one processor, cause the processor or processors to: i) handle network communication to and/or from multiple information sources for gathering emergency response information from said information sources, including at least video data related to an emergency and/or security situation and additional emergency response information; ii) extract subsets of information from said emergency response information at least partly based on input originating from one or more users and/or operators; and iii) perform processing of said emergency response information to enable formation of a common overview of the emergency and/or security situation valid for different users/operators, while also enabling said emergency response information and/or extracted subsets thereof to be processed, compiled and/or filtered, and/or presented to a specific user and/or operator in a way that is customized for said specific user and/or operator of the emergency response system.

As an example, there is also provided a computer-program product comprising a non-transitory computer-readable medium having stored thereon a computer program comprising instructions, which when executed by at least one processor, cause the processor or processors to: i) receive emergency response information from a back-end system of said emergency response system including at least video data related to an emergency and/or security situation and additional emergency response information; and ii) provide a common overview of the emergency and/or security situation based on said emergency response information and/or extracted subsets thereof for presentation and/or visualization to one or more users and/or operators, wherein said common overview is valid for different users/operators, while also enabling presentation and/or visualization of said emergency response information and/or extracted subsets thereof to a specific user and/or operator in a way that is customized for said specific user and/or operator of the emergency response system.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

Alternatively, it is possible to realize the module(s) predominantly by hardware modules, or alternatively by hardware, with suitable interconnections between relevant modules. Particular examples include one or more suitably configured digital signal processors and other known electronic circuits, e.g. discrete logic gates interconnected to perform a specialized function, and/or Application Specific Integrated Circuits (ASICs) as previously mentioned. Other examples of usable hardware include input/output (I/O) circuitry and/or circuitry for receiving and/or sending signals. The extent of software versus hardware is purely implementation selection.

It will be appreciated that the methods and systems described herein can be combined and re-arranged in a variety of ways, and that the methods can be performed by one or more suitably programmed or configured digital signal processors and other known electronic circuits (e.g. discrete logic gates interconnected to perform a specialized function, or application-specific integrated circuits). Many aspects of this invention are described in terms of sequences of actions that can be performed by, for example, elements of a programmable computer system. The steps, functions, procedures and/or blocks described above may be implemented in hardware using any conventional technology, such as discrete circuit or integrated circuit technology, including both general-purpose electronic circuitry and application-specific circuitry.

Alternatively, at least some of the steps, functions, procedures and/or blocks described above may be implemented in software for execution by a suitable computer or processing device such as a microprocessor, a Central Processing Unit (CPU), an Application-Specific Integrated Circuit (ASIC) processor, a Digital Signal Processor (DSP), a Graphics Processing Unit (GPU), and/or any suitable programmable logic device such as a Field Programmable Gate Array (FPGA) device and a Programmable Logic Controller (PLC) device.

It should also be understood that it may be possible to re-use the general processing capabilities of any device in which the invention is implemented. It may also be possible to re-use existing software, e.g. by reprogramming of the existing software or by adding new software components. It is also possible to provide a solution based on a combination of hardware and software. The actual hardware-software partitioning can be decided by a system designer based on a number of factors including processing speed, cost of implementation and other requirements.

As discussed herein, it is possible to provide computing services (hardware and/or software) where the resources are delivered as a service to remote locations over a network. By way of example, this means that functionality, as described herein, can be distributed or re-located to one or more separate physical nodes or servers. The functionality may be re-located or distributed to one or more jointly acting physical and/or virtual machines that can be positioned in separate physical node(s), e.g. in the so-called cloud. This is sometimes also referred to as cloud computing, which is a model for enabling ubiquitous on-demand network access to a pool of configurable computing resources such as networks, servers, storage, applications and general or customized services.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible.

The invention claimed is:

1. A back-end system for public safety emergency response, also referred to as the back-end part of a public safety emergency response system,
wherein said back-end system for public safety emergency response is configured to handle network communication to and/or from multiple information sources for gathering emergency response information from said information sources, including at least audio and/or video data related to an emergency and/or security situation and additional emergency response information,
wherein said back-end system for public safety emergency response is configured to extract subsets of information from said emergency response information at least partly based on input originating from one or more users and/or operators,
wherein said back-end system for public safety emergency response is configured to perform processing of said emergency response information to enable formation of a common overview of the emergency and/or security situation valid for different users/operators and configured to perform processing to enable formation of a virtual working area where users and/or operators are able to cooperate and interact in real time or near real time to handle a common emergency situation or a common security situation,
wherein said back-end system for public safety emergency response is further configured to perform processing of said emergency response information to support at least two types of visualization; a first type of visualization using input from external sensors and cameras for rendering and visualization of the emergency situation, and a second type of visualization for visualization of users/operators in said virtual working area to allow natural interaction and communication even though the users/operators are not co-located, and wherein said second type of visualization is configured for visualizing the interacting users/operators based on camera scanning of the users/operators and transferring video/image information and 3D data of each scanned user/operator into a virtual reality environment in which the users/operators may interact in the same virtual location.

2. The back-end system of claim 1, wherein said back-end system is configured to enable connection to several operators and/or supporting personnel, on-site and/or off-site for enabling cooperative teamwork between various individual users/operators that can see and hear the same or similar information.

3. The back-end system of claim 1, wherein said back-end system is configured to perform processing of said emergency response information to also enable said emergency response information and/or extracted subsets thereof to be processed, compiled and/or filtered, and/or presented to a specific user and/or operator in a way that is customized for said specific user and/or operator of the emergency response system.

4. The back-end system of claim 3, wherein said back-end system is configured to perform processing of said emergency response information to enable said emergency response information and/or extracted subsets thereof to be processed, compiled and/or filtered, and/or presented to said specific user and/or operator in a way that is customized in dependence on the emergency or security situation and/or profile, role or priority of the user.

5. The back-end system of claim 1, wherein said back-end system is configured to extract a plurality of subsets of decision-making parameters based on real-time emergency data, and to select a relevant subset from the plurality of subsets of decision-making parameters based on a request from a front-end interface and generate a corresponding emergency response, and to transmit the generated emergency response to the front-end interface.

6. The back-end system of claim 1, wherein said back-end system is configured to allow at least audio and/or video data to be collected, transferred and/or combined with other data for presentation to one or more users or operators, normally superimposed together with information to support enhanced perception and understanding of the situation and the surroundings.

7. The back-end system of claim 1, wherein said back-end system is configured to respond to a viewport request from a client application managed by a user/operator of the emergency response system and to relay at least audio and/or video data corresponding to the viewport request towards the client application.

8. The back-end system of claim 7, wherein said viewport request includes information representative of the head direction of a user, and said back-end system is configured to adapt viewport based on the head direction and to transfer the corresponding viewport-based video and/or additional data towards the client application for rendering.

9. The back-end system of claim 8, wherein said back-end system is implemented as a server application, and a viewport in the server application is adapted to match the user's head direction, and said back-end system is configured to stream at least audio and/or video data corresponding to the viewport back towards the client application for rendering.

10. The back-end system of claim 7, wherein said viewport request is related to an omnidirectional camera or a virtual 3D image/video representation for requesting a selected viewport of said omnidirectional camera or said virtual 3D image/video representation.

11. The back-end system of claim 7, wherein said viewport request is related to a 3D virtual space rendered by a software application within which the user may navigate, wherein said 3D virtual space is built up or populated based on image/video data from one or more cameras, and/or computer-generated graphics, and/or one or more sound sources.

12. The back-end system of claim 1, wherein said back-end system is at least partly implemented on one or more edge servers/nodes and/or cloud servers/nodes, and said back-end system is configured to deliver at least part of said emergency response information to a front-end system of at least one user and/or operator via a closest edge server/node over a radio communication network.

13. The back-end system of claim 1, wherein said back-end system is configured to operate based on a distribution service, for transferring emergency response information between the back-end system and a front-end system of at least one user and/or operator, that uses a Service Level Agreement (SLA) communication network for providing secure and stable communication/transfer of data with encryption and guaranteed level of quality and availability.

14. The back-end system of claim 1, wherein emergency response information is transferred between the back-end system and a front-end system of at least one user and/or operator at least partly via a 5G radio communication network.

15. A front-end system for public safety emergency response, also referred to as the front-end part of a public safety emergency response system,
wherein said front-end system for public safety emergency response is configured to receive emergency response information from a back-end system of said emergency response system including at least audio and/or video data related to an emergency and/or security situation and additional emergency response information,
wherein said front-end system for public safety emergency response is configured to provide a common overview of the emergency and/or security situation based on said emergency response information and/or extracted subsets thereof for presentation and/or visualization to one or more users and/or operators, wherein said common overview is valid for different users/operators, and to enable presentation and/or visualization of a common working area formed as a virtual environment where users and/or operators are able to cooperate and interact in the same virtual environment and/or working area in real time or near real time to handle a common emergency situation or a common security situation,
wherein said front-end system for public safety emergency response is configured to support at least two types of visualization; a first type of visualization using input originating from external sensors and cameras for rendering and visualization of the emergency situation, and a second type of visualization for visualization of users/operators in said virtual environment to allow natural interaction and communication even though the users/operators are not co-located, and
wherein said second type of visualization is configured for visualizing the interacting users/operators based on video/image information and 3D data obtained from camera scanning of the users/operators and transferring the video/image information and 3D data of each scanned user/operator into a virtual reality environment in which the users/operators may interact in the same virtual location.

16. The front-end system of claim 15, wherein said front-end system is configured to enable and/or effectuate presentation and/or visualization of said emergency response information and/or extracted subsets thereof to a specific user and/or operator in a way that is customized for said specific user and/or operator of the emergency response system.

17. The front-end system of claim 16, wherein said front-end system is configured to enable presentation and/or visualization of said emergency response information and/or extracted subsets thereof to a specific user and/or operator in a way that is customized in dependence on the emergency or security situation and/or profile, role or priority of the user.

18. The front-end system of claim 15, wherein at least part of said front-end system is implemented as a front-end block on a server for cooperation with a client application, and/or
wherein at least part of said front-end system is implemented as a client application serving as an interface towards and/or from one or more users/operators.

19. The front-end system of claim 15, wherein said front-end system is configured to enable presentation of selected information including audio and video streams, maps, weather and infrastructure presentations, and/or traffic information to the user/operator.

20. The front-end system of claim 15, wherein said front-end system is adapted for use with immersive visualization technology for rendering and/or visualizing at least part of said emergency response information and/or extracted subsets thereof.

21. The front-end system of claim 15, wherein said front-end system is configured for use with immersive visualization technology that provides an immersive overview of the situation, including a superposition of different emergency response information.

22. The front-end system of claim 15, wherein the front-end system is configured for interaction with an information presentation sub-system, which employs head worn see-through imagery displays/glasses and immersive Virtual Reality/Mixed Reality/Augmented Reality (VR/MR/AR) technologies and utilizes head-tracking for providing a transparent canopy effect for a user/operator.

23. The front-end system of claim 15, wherein said front-end system is configured to send a viewport request to the back-end system of the emergency response system and to receive at least audio and/or video data corresponding to the viewport request, from the back-end system.

24. The front-end system of claim 23, wherein said viewport request includes information representative of the head direction of a user, and said front-end system is configured to send the information representative of the head direction of the user to the back-end system, and receive at least audio and/or video data corresponding to a viewport adapted based on the head direction.

25. The front-end system of claim 23, wherein said viewport request is related to an omnidirectional camera or a virtual 3D image/video representation for requesting a selected viewport of said omnidirectional camera or said virtual 3D image/video representation.

26. The front-end system of claim 15, wherein said front-end system is configured to operate as a decision support system and/or command control center for enabling emergency response decisions and/or actions.

27. A computer-implemented demonstration system of an emergency response system comprising a back-end system, also referred to as the back-end part of a public safety emergency response system, said computer-implemented demonstration system comprising a processor and memory, said memory having instructions, wherein when said instructions are executed by said processor, said instructions cause said processor to execute and operate said demonstration system based on emergency response information relating to a fictive emergency and/or security situation or an emergency and/or security situation that has already occurred,
wherein said back-end system for public safety emergency response is configured to handle network communication to and/or from multiple information sources for gathering emergency response information from said information sources, including at least audio and/or video data related to an emergency and/or security situation and additional emergency response information,
wherein said back-end system for public safety emergency response is configured to extract subsets of information from said emergency response information at least partly based on input originating from one or more users and/or operators,
wherein said back-end system for public safety emergency response is configured to perform processing of said emergency response information to enable formation of a common overview of the emergency and/or security situation valid for different users/operators and configured to perform processing to enable formation of a virtual working area where users and/or operators are able to cooperate and interact in real time or near real time to handle a common emergency situation or a common security situation,
wherein said back-end system for public safety emergency response is further configured to perform processing of said emergency response information to support at least two types of visualization; a first type of visualization using input from external sensors and cameras for rendering and visualization of the emergency situation, and a second type of visualization for visualization of users/operators in said virtual working area to allow natural interaction and communication even though the users/operators are not co-located, and
wherein said second type of visualization is configured for visualizing the interacting users/operators based on camera scanning of the users/operators and transferring video/image information and 3D data of each scanned user/operator into a virtual reality environment in which the users/operators may interact in the same virtual location.

* * * * *